United States Patent [19]
Murashita et al.

[11] Patent Number: 5,485,213
[45] Date of Patent: Jan. 16, 1996

[54] METHOD AND APPARATUS FOR ENCODING AND DECODING IMAGE DATA

[75] Inventors: Kimitaka Murashita; Tsugio Noda, both of Kawasaki, Japan

[73] Assignee: Fujitsu Limited, Kawasaki, Japan

[21] Appl. No.: 233,982

[22] Filed: Apr. 28, 1994

[30] Foreign Application Priority Data

Sep. 17, 1993 [JP] Japan .................. 5-230696

[51] Int. Cl.$^6$ .................. H04N 7/36
[52] U.S. Cl. .......... 348/415; 348/420; 348/423
[58] Field of Search .................. 348/423, 401, 348/420, 421, 415; H04N 7/133, 7/137, 7/36

[56] References Cited

U.S. PATENT DOCUMENTS 5,093,720  3/1992  Krause .................. 348/413
5,227,878  7/1993  Puri .................. 348/416

Primary Examiner—Howard W. Britton
Attorney, Agent, or Firm—Staas & Halsey

[57] ABSTRACT

A designated field image is extracted instead of a frame image and only the effective block of the field image which was judged as a block having a change is also encoded. Block information and field information are added to the encoded block and the resultant data is transmitted as moving image code data. On the decompressing side, only the field image data separated from the moving image code data is decompressed and updated and the updated field is copied as another field which was not updated, thereby decompressing the image data of one frame. The field image data is alternately switched and encoded. Further, when a code amount increases, the same field as the previous frame is encoded. On the decompressing side, the updated field image data is copied to the field image data which is not updated and two field images are equalized, thereby preventing a visual deviation due to a difference between the field images.

19 Claims, 22 Drawing Sheets

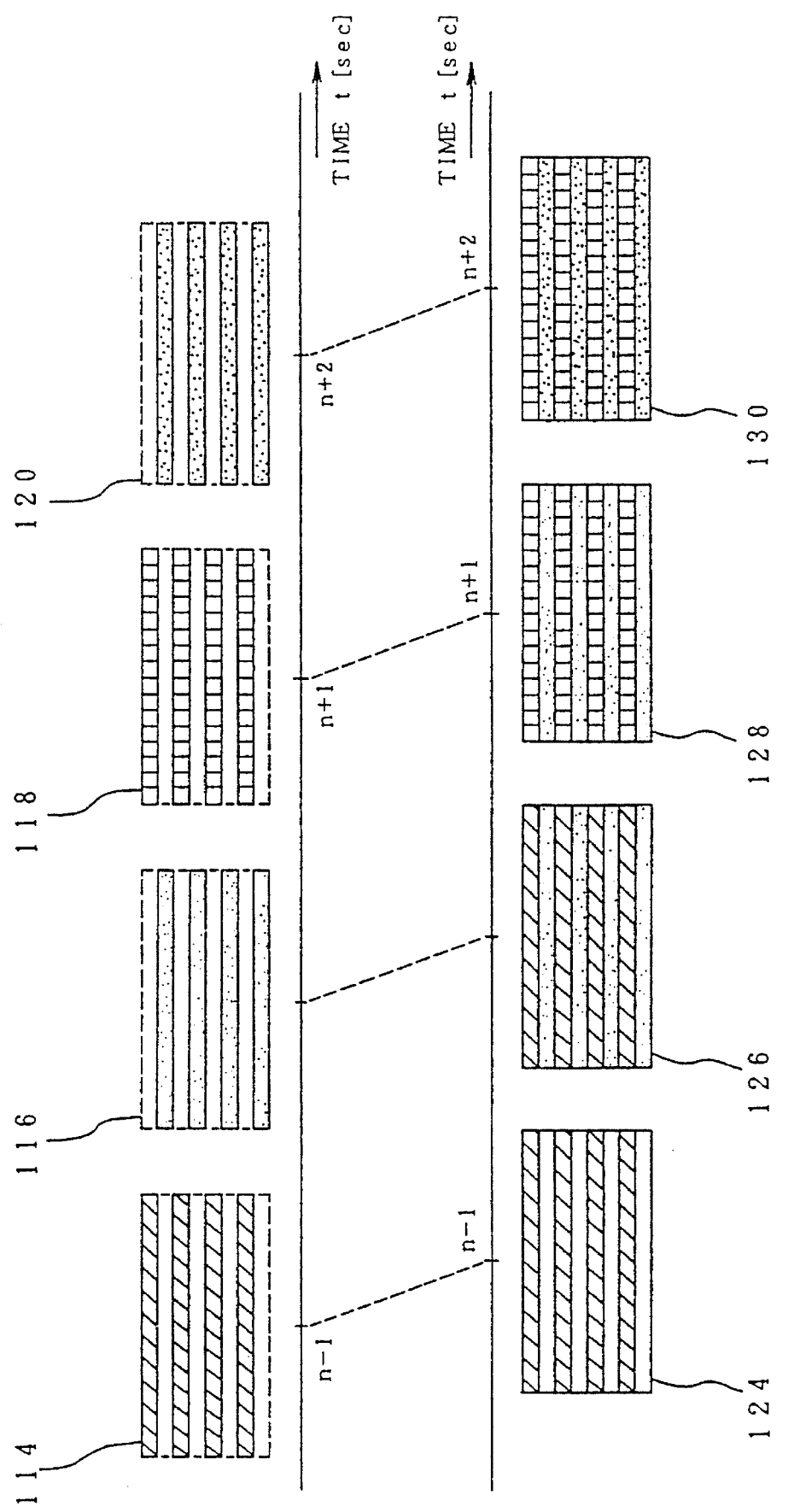

METHOD AND APPARATUS FOR ENCODING AND DECODING IMAGE DATA

BACKGROUND OF THE INVENTION

FIELD OF THE INVENTION

The present invention relates to encoding and decoding method and apparatus of image data for compressing continuous image data and decompressing an image from the compressed data and, more particularly, to encoding and decoding method and apparatus of image data in which each of a plurality of images is divided into blocks each comprising a plurality of pixels and the pixels in the block are orthogonal transformed and encoded.

In order to accumulate or transmit at a high speed with a high quality image data whose information amount is much larger than that of numerical value data, particularly, data such as half tone image or color image, it is necessary to efficiently encode a gradation value of each pixel. As a high efficient compressing method of image data, for example, there is an adaptive discrete cosine transforming (hereinafter, referred to as an ADCT) method. According to the ADCT, an image is divided into blocks each comprising (8×8) pixels and the pixel signals of each block are transformed into DCT coefficients of a space frequency distribution by a two-dimensional discrete cosine transformation (hereinafter, referred to as a DCT). Subsequently, the DCT coefficients are quantized by a threshold value which is adapted to an eyesight and the quantized DCT coefficients obtained are encoded by a Huffman table which was statistically obtained.

Hitherto, according to the encoding of a moving image, although a compression ratio that is higher than that by the encoding of a still image is obtained, there are contrarily drawbacks such as large circuit scale, low picture quality, high costs, and the like. Encoding and decoding method and apparatus of image data, which can solve the above problems, have already been proposed (Japanese Patent Application No. 77,957/1992). FIG. 1 shows an encoder which has been proposed by the present inventors et al. of the present invention. Image data, which is obtained by cutting and extracting images of one frame as a target to be encoded on a block unit basis of total 64 pixels [(eight pixels in the vertical direction)×(eight pixels in the lateral direction)], is input to an input terminal 200. The images which were encoded up to the previous frame have been held as reference images in a reference frame holding section 204. An effective block discriminating section 206 compares the image data from the input terminal and image data of a reference image existing at the same block position. When there is a change, the block is determined to be an effective block. When there is no change, the block is determined to be an invalid block. An encoding section 202 performs the encoding to only the effective block which was judged as a block having a change by the effective block discriminating section 206, and adds block information indicative of the presence or absence of an effective block to the image data and transmits from an output terminal 210. That is, with respect to a continuous moving image, when comparing the image of the present frame and the image of the previous frame, a moving image region having a change and a still image region having no change exist. In this instance, only the moving image region having a change is encoded in accordance with an encoding algorithm of a still image. The encoded data is transmitted together with block information indicative of the block position of the change region.

FIG. 2 shows an apparatus for decoding a continuous moving image from the data sent from the encoder. Input data from an input terminal 212 is input to a code separating section 214, by which it is separated into block information and encoded data. A decoding section 216 decodes the image on a block unit basis from the encoded data. In this instance, since the block information indicative of the positions of the effective blocks has been given to an address generating section 218, address signals indicative of the block positions of the decoded image are generated on a pixel unit basis. The pixel signals of the relevant block in a decoded image holding section 220 are rewritten and updated in accordance with the address signals. By executing such encoding and decoding processes, a high compression ratio and a high picture quality can be obtained in accordance with simple encoding algorithm and decoding algorithm of a still image.

In the apparatus of FIG. 1, whether the block is an effective block or an invalid block is judged by a correlation between the image of the present frame which is at present a target to be processed and a reference frame image and all of the effective blocks of one frame are encoded. However, there is considered a case where a code amount is too large in dependence on a transmission path and a satisfactory number of transmission images per unit time cannot be obtained.

In case of transmitting image data through a communication network such as an ISDN (Integrated Services Digital Network) or the like, generally, a proper code rate to decide a code amount which can be output per frame by an encoder is previously decided in consideration of the maximum transfer speed or the like of the communication network. In case of storing the encoded data to a memory medium, such a code rate is decided in consideration of a memory capacity of the memory medium. For example, assuming that the maximum transfer speed of the communication network is equal to 64,000 bps and a moving image such that one byte consists of eight bits and 30 frames are displayed per second is transmitted, the code rate is $$64000 \text{ bps}/30 \text{ frames} = 2133 \text{ bits/frame}$$
$$= 267 \text{ bytes/frame}$$

Therefore, when a code amount of one frame is equal to or less than 267 bytes, a moving image of 30 frames per second can be transmitted. Therefore, the optimum code rate (code amount of one frame) is set to a value of 267 bytes or less, for example, 260 bytes. However, in dependence on a transmission path, there is considered a case where when the effective blocks of one frame are encoded, a code amount is too large and a transfer speed which enables the moving image of 30 frames per second to be transmitted cannot be assured and a satisfactory number of transmission frames cannot be obtained. Even in case of a transmission path which enables the moving image of 30 frames per second to be transmitted, there is a problem such that in the case where what is called a sudden frame such that a change region of an image suddenly increases and the number of transmission frames decreases occurs, the number of decoding frames per unit time temporarily decreases, so that a motion of the decoded image is not smooth or the like.

SUMMARY OF THE INVENTION

According to the invention, there are provided image data encoding and decoding method and apparatus for compressing and transferring still images by a small code amount and for decoding a moving image of a high picture quality.

The invention is characterized in that with respect to a moving image region having a change in the present frame, the original image data as it is instead of the difference data is encoded by an algorithm of a still image.

A compressing apparatus of image data comprises: an image holding section, a field extracting section, an odd line reference field holding section and an even line reference field holding section as a reference field holding section; a change discriminating section; a compressing field designating section; a compressing section; and a code output section. The image holding section holds the image data which is continuously input on a frame unit basis. The compressing field designating section designates either one of the image data of an odd number field and the image data of an even number field which are targets to be compressed. The field extracting section extracts the image data of the odd or even number field from the image data of the present frame held in the image holding section on the basis of the result of the designation of the compressing field designating section. Each of the reference odd field holding section and the reference even field holding section holds the reference field image data every field. In the change discriminating section, a correlation value between the image with respect to the field image data extracted from the present frame by the field extracting section and the image at the same position of the reference field which comprises the effective blocks encoded until the previous frame and which was held in the reference field holding section is obtained every block which is obtained by dividing the field image into blocks on a unit basis of a plurality of pixels of [(m pixels in the vertical direction)×(n pixels in the lateral direction)]. On the basis of the correlation value, a check is made to see if the block is an effective block indicating that the block changes or an invalid block indicative of no change. The compressing section compresses only the block of the field image data which was judged to be an effective block. The code output section adds block information of one field which indicates whether the block is an effective block or an invalid block and was obtained as a result of the discrimination of the change discriminating section to the encoded data of one field from encoding means 24 and outputs the resultant data.

The compressing field designating section uses either one of the following three designating methods.

I. Either one of the odd field and the even field is fixedly designated.

II. The designation of the odd field or the even field is alternately switched every other frame.

III. In the case where a code amount of one frame is equal to or less than a predetermined threshold value (when an image change is small), the image of the field different from the field which was compressed in the previous frame is designated as a target to be compressed. When a code amount of the previous frame exceeds the predetermined threshold value (when an image change is large), the same field as the field which was compressed in the previous frame is designated as a target to be compressed.

The compressing field designation by the above method III solves the following problems. In the case where the code amount is still large and the number of transmission frames decreases even if the compression is performed by the alternate designation of the odd field and even field because of a limitation of a transmitting ability of a transmission line, there is a case where a difference between the updated field and the field which is not updated is recognized. Particularly, when the target image remarkably moves, a movement amount of the image of one frame is large, so that a difference of the images between the fields typically appears. The picture quality is largely deteriorated due to the alternate compression of the odd field and even field. Therefore, when the movement of the image is remarkable as mentioned above, namely, when the code amount increases, the same field is continuously compressed and, on the decompressing side, by copying the decompressed field to the field which is not decompressed, the difference between the fields is eliminated.

The code output section adds only the block information and outputs the resultant data and doesn't need to add the field information. In such a case, the designation field is individually discriminated on the decompressing side. Further, the output section can also compress the block information as a bit map indicating whether the block is an effective block or an invalid block into run length codes or the like and transmit them without sending the block information as it is.

According to the invention, a decompressing apparatus for continuously decompressing image data is provided. Input means inputs data including encoded data of one field which is sent from a compressing apparatus, block information indicative of the presence or absence of an effective block of the field image data, and field information indicative of a compressing field. A decompressed image holding section holds the decompressed field image data every field. A code separating section separates the field encoded data, block information, and field information from the input data. A decompressing section decompresses the field image data from the field encoded data which was separated by the code separating section. An updating section updates a relevant region of the decompressed field image data held in the decompressed image holding section by the address designation based on the block information and the field information which were separated by the code separating section. Further, in the case where the decompressing field of the present frame is the same as the decompressing field from the field information which was separated by the code separating section, a field copying section copies the decompressing field image data of the present frame which was updated by the updating section to another field image data which is not at present a target to be decompressed, thereby preventing a deviation of the field image for a sudden image change.

As for the decompression of the encoded data in the case where no field information is added, a decompressing field designating section is newly provided for the decompressing apparatus. In the case where a code amount of the field encoded data which was separated by the code separating section is equal to or less than a predetermined threshold value, a field different from the previous frame is designated as a decompressing field. In the case where the code amount of the field encoded data exceeds the predetermined threshold value, the same field as the previous frame is designated as a decompressing field. Due to this, in the case where the previous frame obtained by the decompressing field designating section is the same as the decompressing field of the present frame, the field copying section copies the decompressing field image of the present frame which was updated by the updating section to another field image data which is not at present a target to be decompressed.

The following operations are obtained according to such encoding and decoding method and apparatus of image data of the present invention. An interlace process is ordinarily executed to a moving image of a television or the like. For example, according to the NTSC system as a standard television system in Japan and the U.S.A., one frame consists of two fields and an odd line or an even line is alternately drawn every ⅟₆₀ second. That is, as a size of one frame of the NTSC image, one frame is constructed by two field picture planes each comprising [(640 pixels in the lateral direction)×(240 pixels in the vertical direction)]. In the invention, a compression is executed with respect to any one of the field images constructing the frame image instead of the frame image. Since the number of pixels in the vertical direction of the field image is equal to the half of the number of pixels of the frame image, namely, 240 pixels, an information amount is reduced into ½ at the stage of the original image. A code amount is also, consequently, reduced into about ½ of that of the frame image. Even when the code amount suddenly increases due to a change in motion of the image, by compressing only the field, the increase in code amount can be absorbed.

On the decompressing side, only the field image sent is decompressed and updated and another field which is not updated is copied by the updated field, so that an image of one frame can be decompressed. In case of fixing the field to be compressed, however, since the pixels of the frame image are sampled into ½, in the case where a state in which the number of transmission frames per unit time cannot be assured always continues, the deterioration of the picture quality is conspicuous and the information amount which the image inherently possesses drops. Therefore, by alternately switching the field images and compressing, the drop-out of the spatial information amount can be prevented.

Further, according to the invention, in the case where a code amount of the nth frame is large and the compression and transmission are not finished within a frame period of time and the compression and transmission are finished at a time point when the next (n+1)th frame comes, the same field as the nth frame which was compressed is compressed with regard to the next (n+2)th frame. As for the decompression of the encoded data of the (n+2)th frame, the field image designated by the field information is updated by the decompressing field image and the updated field image is copied to the field image which is not updated. Therefore, the two field images are equalized, a visual deviation due to the difference between the field images doesn't occur, and a feeling of physical disorder is not given. In this instance, by copying the decompressing field image to another field, a resolution temporarily deteriorates. However, when the code amount decreases, by restarting the processes to alternately extract, compress, decompress, and update the field image, the resolution can be recovered.

The above and other objects, features, and advantages of the present invention will become more apparent from the following detailed description with reference to the drawings.

BRIEF DESCRIPTION OF THE DRAWINGS

FIG. 15 is a time chart showing an encoding and a decoding by an alternate switching of fields according to the second embodiment in FIG. 13;

DETAILED DESCRIPTION OF THE PREFERRED EMBODIMENTS

Figure 3:
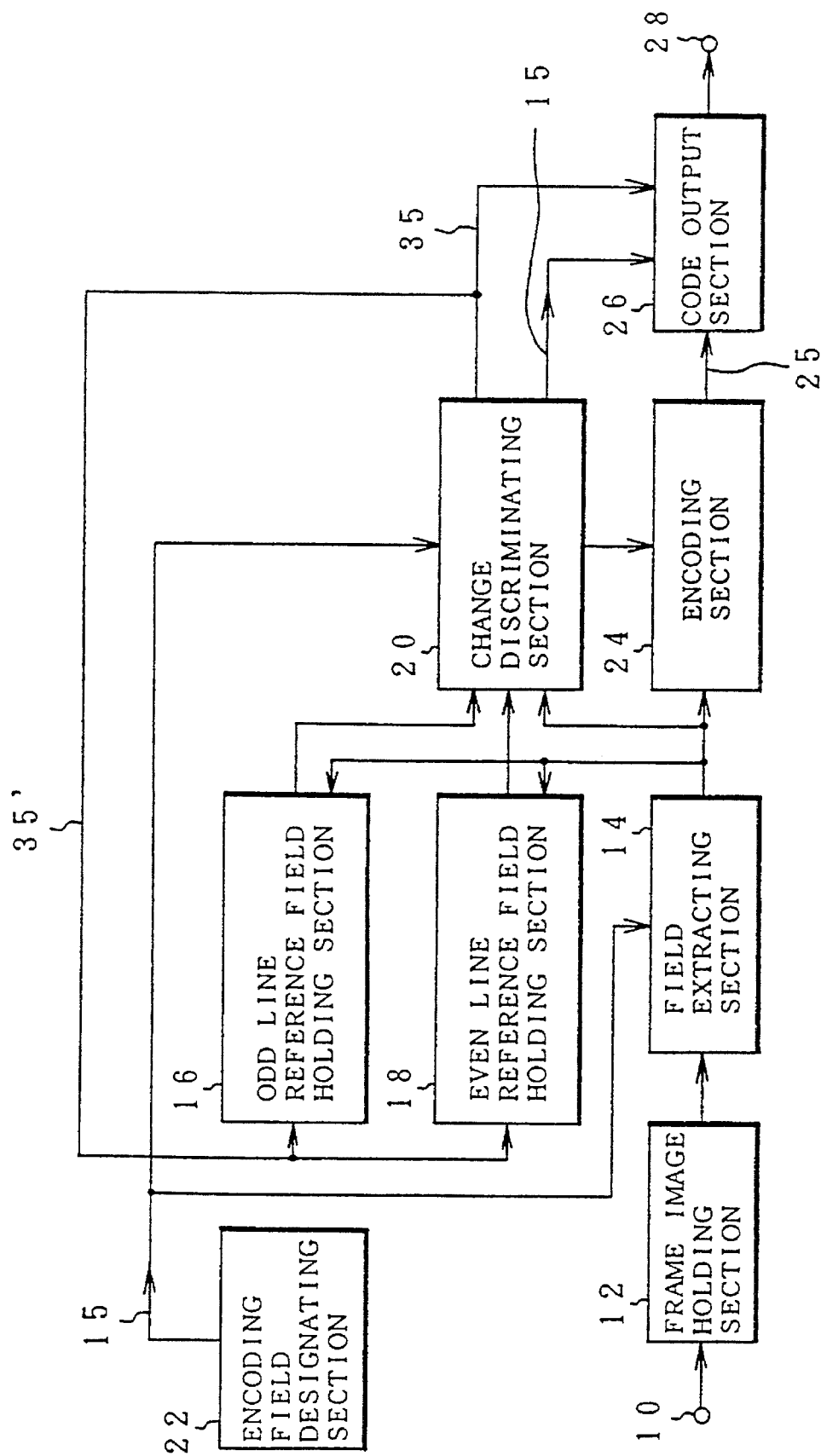
FIG. 3 is a block diagram showing the first embodiment of an encoder of the present invention.

FIG. 3 is a diagram showing the first embodiment of an encoder of the present invention. The encoder of the first embodiment comprises: an input terminal 10; a frame image holding section 12; a field extracting section 14; an odd line reference field holding section 16; an even line reference field holding section 18; a change discriminating section 20; an encoding field designating section 22; an encoding section 24; a code output section 26; and an output terminal 28. A plurality of frame image data formed as a moving image are input from the input terminal 10 every frame period. The frame image data which was input from the input terminal 10 is held into the frame image holding section 12 by using a frame memory or the like. The field extracting section 14 extracts the field image data designated by a field designation signal 15 from the frame image data held in the frame image holding section 12. For example, in case of the NTSC system, the frame image data is constructed by [(640 pixels in the vertical direction)×(680 pixels in the lateral direction)] and is based on the interlace system. Therefore, the frame image data comprises two field image data of the first image of odd number lines of [(240 pixels in the vertical direction)×(640 pixels in the lateral direction)] and field image data of even lines. The field extracting section 14 extracts the image data of either one of the fields which was designated by the field designation signal 15 as a target to be encoded. The field image data of the reference field, which comprises the effective blocks encoded until the previous frame, is held in the odd line reference field holding section 16 as reference field image data. The even field image data, which was similarly derived in the reference field, is also held in the even line reference field holding section 18 as reference field image data. The encoding field designating section 22 designates either one of the odd field and the even field. In the first embodiment, either one of the odd field and the even field is fixedly designated. The field extracting section 14 extracts the image data of the odd field or even field designated by the encoding field designating section 22 from the frame image data held in the frame image holding section 12. The change discriminating section 20 discriminates a change in designated field image data with respect to the field as a target which was designated by the field designation signal 15 from the encoding field designating section 22. Specifically speaking, the field image data, which was extracted by the field extracting section 14 on the basis of the field designation signal 15, is compared with a reference field signal, which is read out from the odd line reference field holding section 16 or even line reference field holding section 18 which was designated by the field designation signal 15. A processing unit in the change discriminating section 20 is the same as that in the encoding section 24. Total 64 pixels [=(8 pixels in the vertical direction)×(8 pixels in the lateral direction)] are set to one block. A correlation value of the blocks from the same pixel signal at the same block position extracted from the designating field is calculated, thereby judging the presence or absence of a change. The correlation value, in this instance, is calculated as a sum of the absolute values of differences between the pixel signal and the reference pixel signal at the same position. When the calculated correlation value is equal to or larger than a threshold value, the block is judged as an effective block having a change. On the other hand, when the correlation value is smaller than the threshold value, the block is decided to be an invalid block having no change. Information indicating whether the block is an effective block of one field or an invalid block which was judged by the change discriminating section 20 is output as block information 35. The block information 35 is a bit map indicative of the block positions of one frame. The effective block is set to bit 1. The invalid block is set to bit 0. When outputting, the bit map is output as a one-dimensional bit stream which was sequentially read out in accordance with a predetermined block order. In the case where the change discriminating section 20 finishes the change discrimination regarding one block and the discrimination result indicative of the effective block is obtained, a signal indicative of the effective block is output as a reference image updating signal 35' for the odd line reference field holding section 16 or even line reference field holding section 18 which is at present designated. When the reference image updating signal 35' is received by the odd line reference field holding section 16 or even line reference field holding section 18, a region of the field image data in which the block was decided to be an effective block is updated by the block image data which was extracted and is held in the field extracting section 14 at present.

Figure 4:
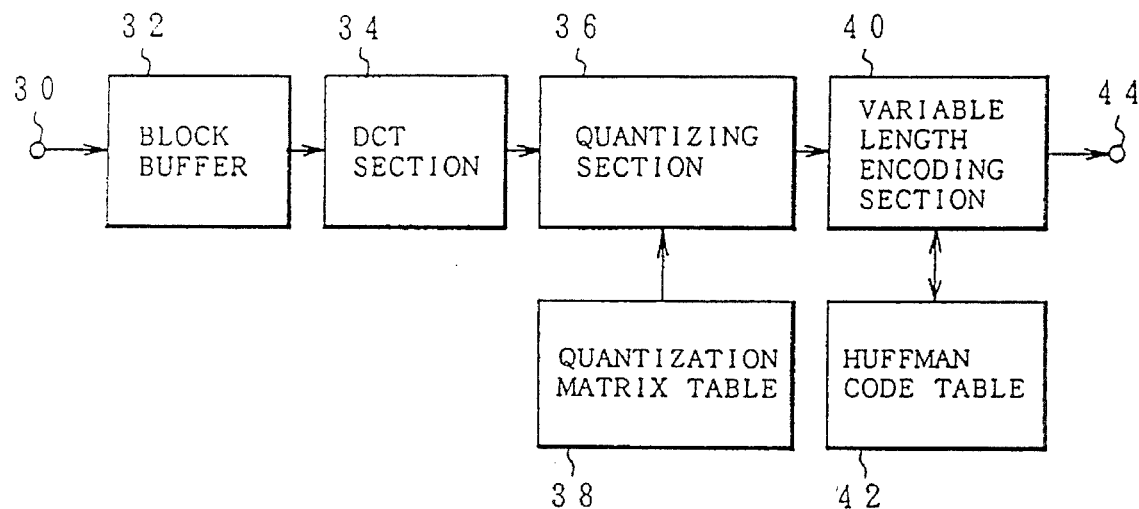
FIG. 4 is a block diagram showing the details of an encoding section in FIG. 3.

The encoding section 24 executes an encoding according to the ADCT with respect to only the block image data of the designating field in which the block was judged as an effective block by the change discriminating section 20. As shown in FIG. 4 in detail, the encoding section 24 comprises: an input terminal 30; a block buffer 32; a DCT section 34; a quantizing section 36; a quantization matrix table 38; a variable length encoding section 40; a Huffman code table 42; and an output terminal 44. Pixel signals of the field, which is at present a target to be encoded, are stored by an amount of one block into the block buffer 32 from the input terminal 30. In this state, when a judgment signal indicative of the effective block is received from the change discriminating section 20, the encoding operation is executed. First, the DCT section 34 reads out the pixel signals held in the block buffer 32 and transforms into DCT coefficients of a space frequency distribution by a two-dimensional discrete cosine transformation. Subsequently, the quantizing section 36 obtains quantization DCT coefficients by quantizing the DCT coefficients from the DCT section 34 by using values of the quantization matrix table 38 as threshold values which are adapted to eyesight. Finally, the variable length encoding section 40 variable length encodes the quantization DCT coefficients by using the Huffman code table 42 which was statistically obtained. The variable length encoded DCT coefficients are transmitted from the output terminal 44. Referring again to FIG. 3, code data 25 from the encoding section 24 and the field designation signal 15 and block information 35 from the change discrimination section 20 are input to the code output section 26.

Figure 5:
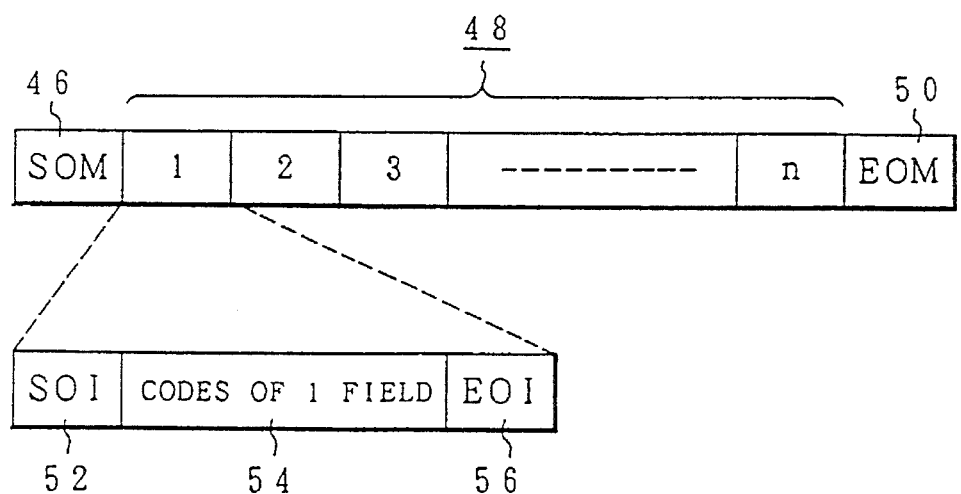
FIG. 5 is an explanatory diagram of a format of moving image code data according to the invention.
Figure 6:
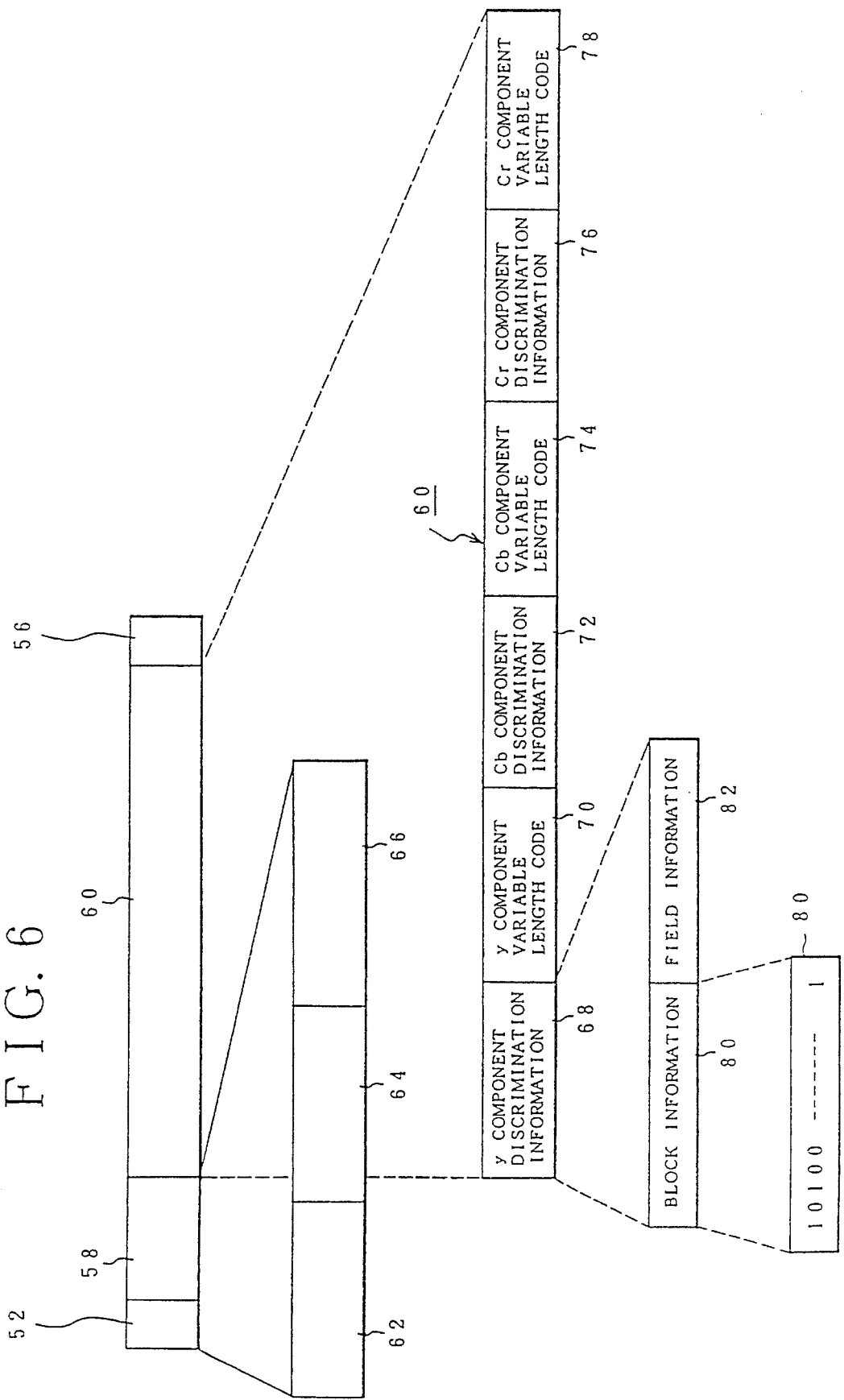
FIG. 6 is an explanatory diagram of a format showing the details of code data of one field in FIG. 5.
Figure 7:
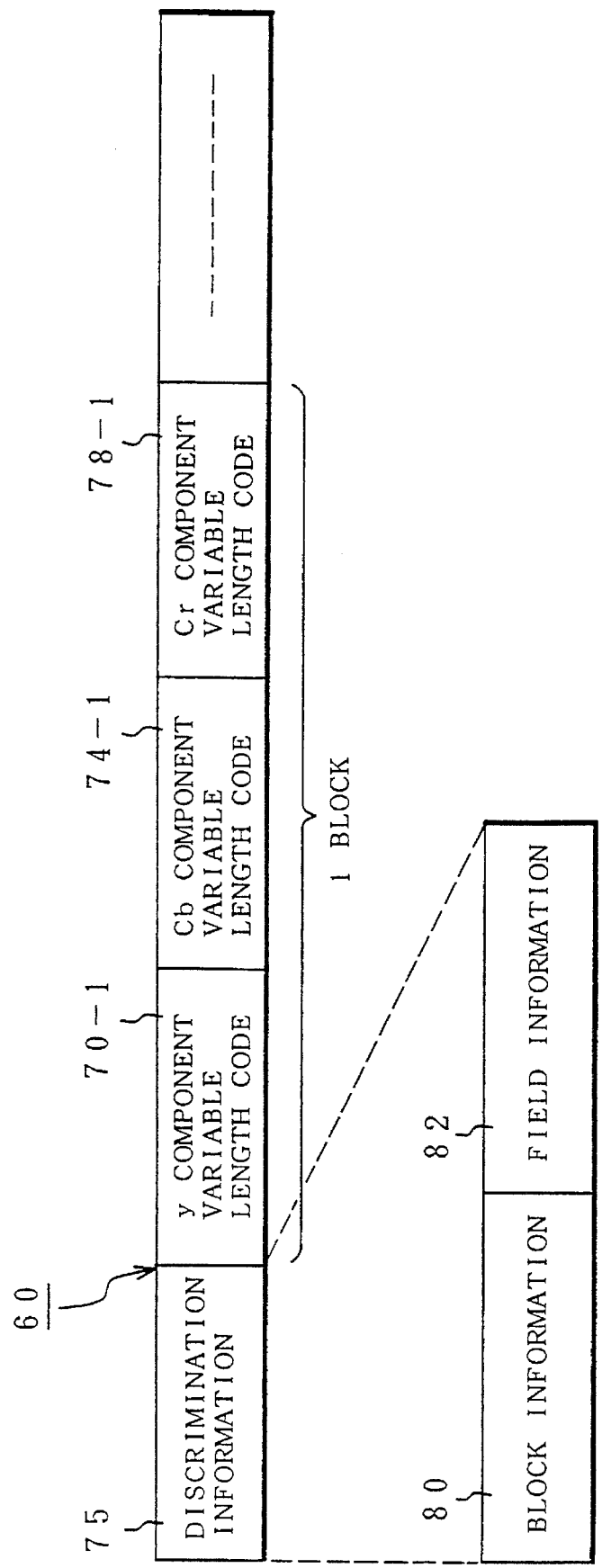
FIG. 7 is an explanatory diagram of a format showing another construction of an encoding section in FIG. 6.

FIG. 5 shows a format of moving image code data which is sent from the encoder in FIG. 3. An SOM (Start of Motion) code 46 is provided in the head of the moving image code data. An EOM (End of Motion) code 50 is provided at the end of the moving image code data. Encoded data 48 of (n) frames is arranged between the SOM code 46 and the EOM code 50 as shown by frame numbers 1, 2, 3, . . . , n. The encoded data of one frame is as shown with respect to the frame number 1. An SOI (Start of Image) code 52 is provided at the beginning, encoded data 54 of one field is subsequently provided, and an EOI (End of Image) code 56 is finally provided. The encoded data 54 of one field is as shown in detail in FIG. 6. After the head SOI code 52, a header 58 is provided. In case of the JPEG (Joint Photographic Image Coding Group) as an international standard of image data, image information 62 is provided in the beginning of the header 58. The image information 62 includes information indicative of an image size, the number of components, an encoding order, and the like. Subsequent to the image information 62, quantization threshold values, namely, the values of the quantization matrix table 38 in FIG. 4 are stored. Further, a Huffman table, namely, the values in the Huffman code table 42 shown in FIG. 4 are stored after quantization threshold values 64. As quantization threshold values 64 and Huffman table 66, various values can be directly arranged or parameters to decide those values can be also stored. After the header 58, a code section 60 is provided. In the embodiment, the case of handling a y component of a luminance signal and Cb and Cr components of color difference signals is shown as an example. A y component discrimination information 68 of one field and a y variable length code 70 of one field are stored in the beginning of the code section 60, respectively. The y component discrimination information 68 is constructed by block information 80 and field information 82. The block information 80 is information indicating whether each of the blocks, constructing one field which were output from the change discriminating section 20 in FIG. 3, is an effective block or an invalid block. For example, the block information 80 is constructed by a one-dimensional bit stream such as "10100 . . . 1" of a bit map indicating whether each block is an effective block or an invalid block. As block information 80, it is also possible to perform an encoding such as a run length encoding or the like in order to reduce a code amount in place of the one-dimensional bit stream. In case of the run length code, code data in which bit information indicating whether the block is an effective block or an invalid block and a run length of an array of bits are combined is arranged. As field information 82, a fixedly predetermined field designating code indicative of an odd field or an even field which was designated as a target to be encoded is stored. Only the encoded data of the designating field which was encoded on the basis of the effective block discrimination signal from the change discriminating section 20 by the encoding section 24 in FIG. 3 is stored in the y component variable length code 70 provided subsequent to the y component discrimination information 68. Each of discrimination information 72 and 76 and variable length codes 74 and 78 of the remaining Cb and Cr components is also constructed in a manner similar to the case of the y component. Further, in the JPEG system, with respect to the code section 60 in FIG. 6, as shown in FIG. 7, there is a case of arranging a y component variable length code 70-1, a Cb component variable length code 74-1, and a Cr component variable length code 78-1 every block. Discrimination information 75 of each block is provided in the head portion. Therefore, block information indicative of the block position and field information indicative of the designating field can be also arranged in the discrimination information 75.

Figure 8A:
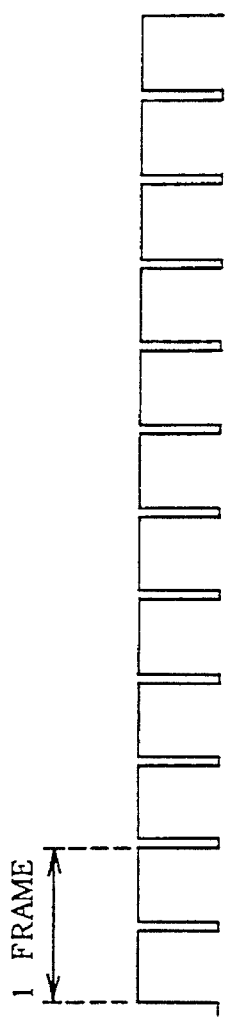
FIGS. 8A, 8B, and 8C are time charts showing a field encoding according to the invention in comparison with a frame encoding.
Figure 8B:
Figure 8C:

FIG. 8A shows an encoding of frame image data which has already been proposed by the inventors et al. of the present invention. Odd field image data and even field image data are sequentially read out for a period of time of one frame and the encoding of one frame is executed. FIG. 8B shows the case where the odd field was designated as a target to be encoded by the encoding field designating section 22 in FIG. 3. Only the odd field image data is read out and encoded every frame period. FIG. 8C shows the case where an even field was designated as a target to be encoded by the encoding field designating section 22 in FIG. 3, and the even field image data of the latter half in the frame period is encoded. As will be obviously understood from time charts of FIGS. 8A, 8B, and 8C, in the field encoding which is executed to the odd field or even field as compared with the frame encoding, an amount of original image data as a target to be encoded can be reduced into ½ and, as a result by the encoding of the field image data, a code amount can be reduced into about ½.

Figure 9:
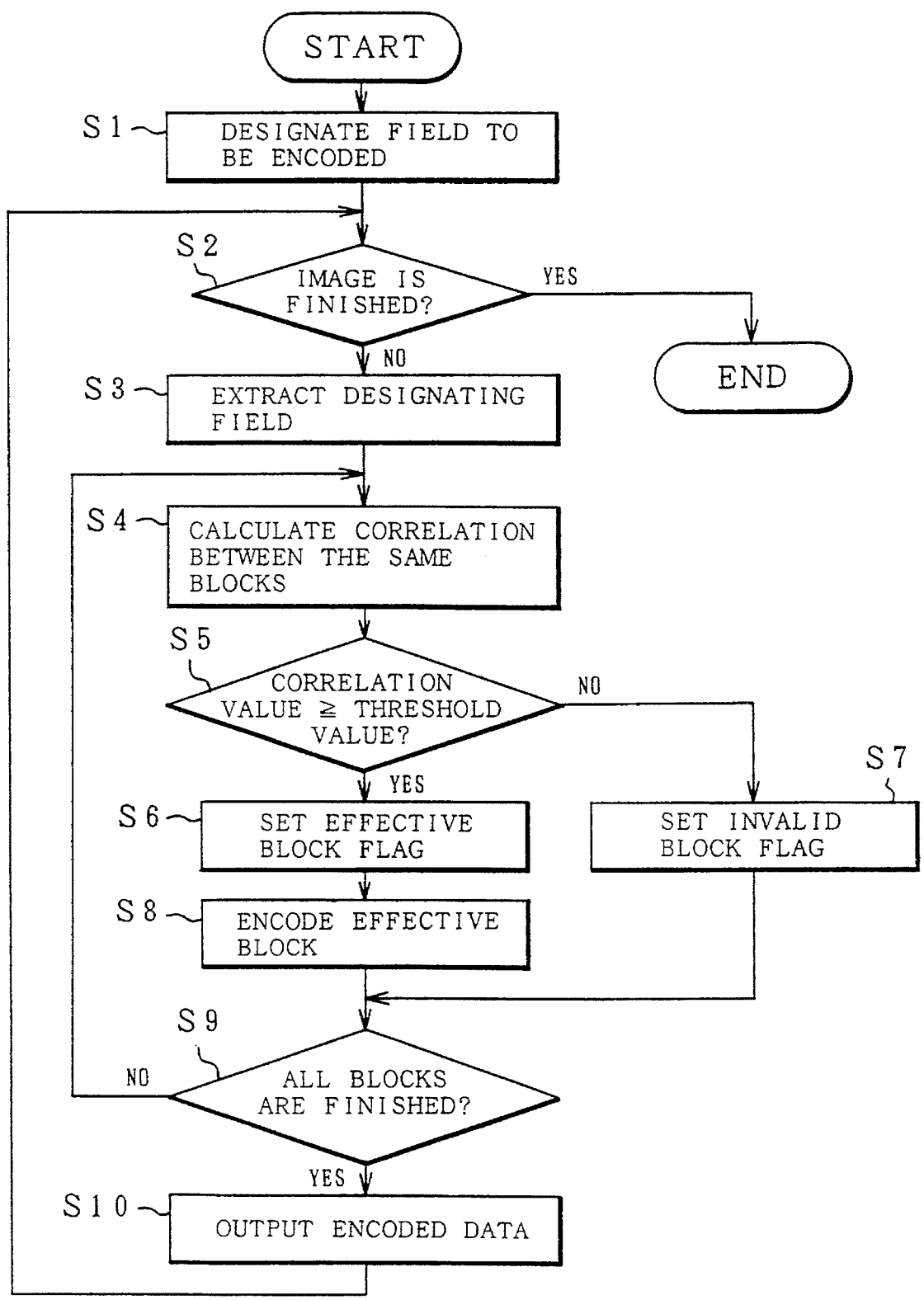
FIG. 9 is a flowchart showing an encoding process in FIG. 3.

A flowchart of FIG. 9 shows an encoding process according to the first embodiment of FIG. 3. First, in step S1, an odd field or an even field is designated as a field to be encoded by the encoding field designating section 22. The designation field is fixedly decided. Subsequently, in step S2, the end of image is judged by checking whether the last EOM (End Of Motion) code 50 of the moving image data shown in FIG. 4 is obtained or not. If NO, the encoding process in step S3 and subsequent steps is executed. In the encoding, the field image data of the designated field is extracted in step S3 and a correlation value between the extracted field image data and the reference field image data at the same block position in the extracted field image data is calculated. The correlation value is obtained as a sum of the absolute values of the differences of the same pixels of the block. In step S5, a check is made to see if the correlation value obtained from the encoding target block and the reference field block is equal to or larger than a predetermined threshold value or not. If YES, step S6 follows and a flag indicative of the effective block is set. That is, the bit of the bit map of one field showing whether the block is an effective block or an invalid block is set to 1. When the correlation value is smaller than the threshold value, a flag indicative of the invalid block is set in step S7. That is, the bit of the bit map is set to 0. Subsequently, the encoding of the block which was decided to be an effective block is executed in steps S4 to S8. The processes shown in steps S4 to S8 are repeated until the end of the processes of all of the blocks constructing one field in step S9. After completion of the processes of all blocks, in step S10, moving image code data, which is obtained by adding the block information indicative of the effective block, or the invalid block and the field information, which is indicative of the designation field to the encoded, data of the effective block which was encoded is output.

Figure 10:
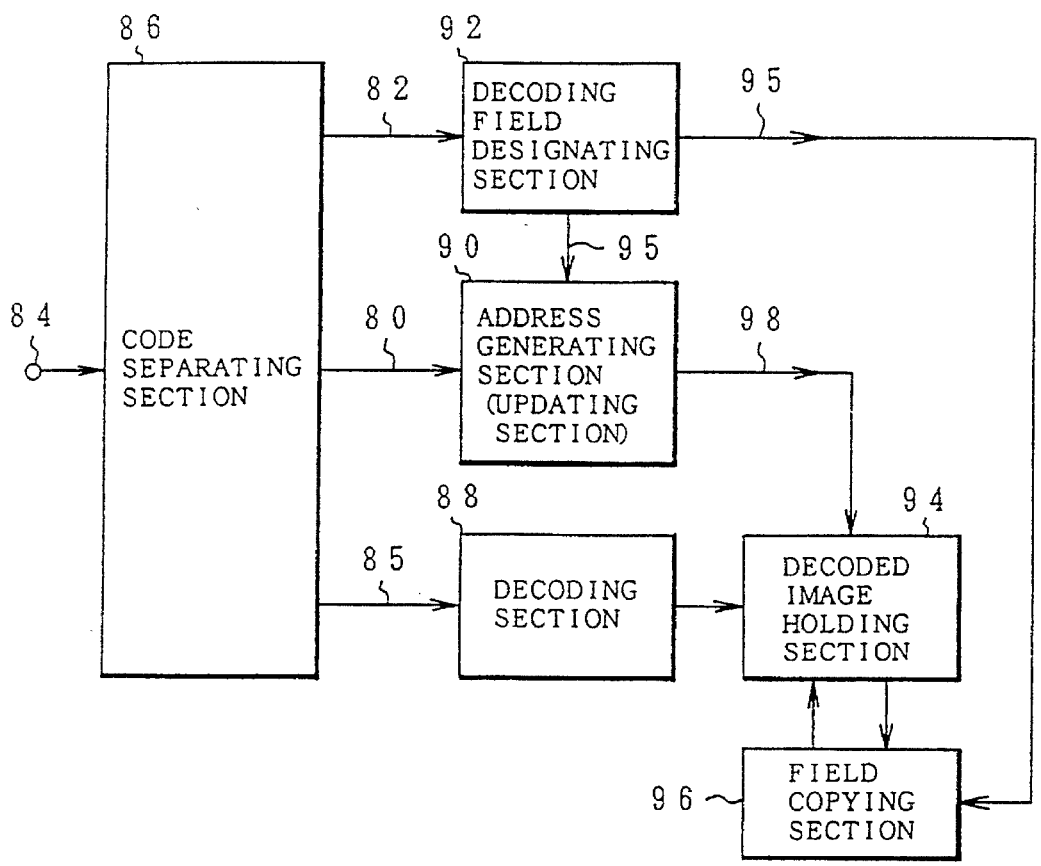
FIG. 10 is a block diagram showing the first embodiment of a decoder of the present invention.

FIG. 10 shows the first embodiment of a decoder of the present invention corresponding to the first embodiment of the encoder in FIG. 3. The decoder comprises: an input terminal 84; a code separating section 86; a decoding section 88; an address generating section 90 which functions as an updating section; a decoding field designating section 92; a decoded image holding section 94; and a field copying section 96. The code separating section 86 separates the encoded data 85, block information 80, and field information 82 included in the moving image code data which was input from the input terminal 84, respectively, and supplies to the decoding section 88, address generating section 90, and decoding field designating section 92. The decoding field designating section 92 discriminates the encoded designation field from the separated field information 82 and outputs a designation field signal 95 to the address generating section 90. Therefore, from the designation field signal 95, the address generating section 90 recognizes whether the address signal of the odd line is generated or the address signal of the even field is generated. The address generating section 90 discriminates the block position constructing one field from the block information 80 and generates an address signal 98 of 64 pixels constructing the block of the decoding field. Further, the decoding section 88 decodes the block image data from the encoded data 85 in FIG. 10.

Figure 11:
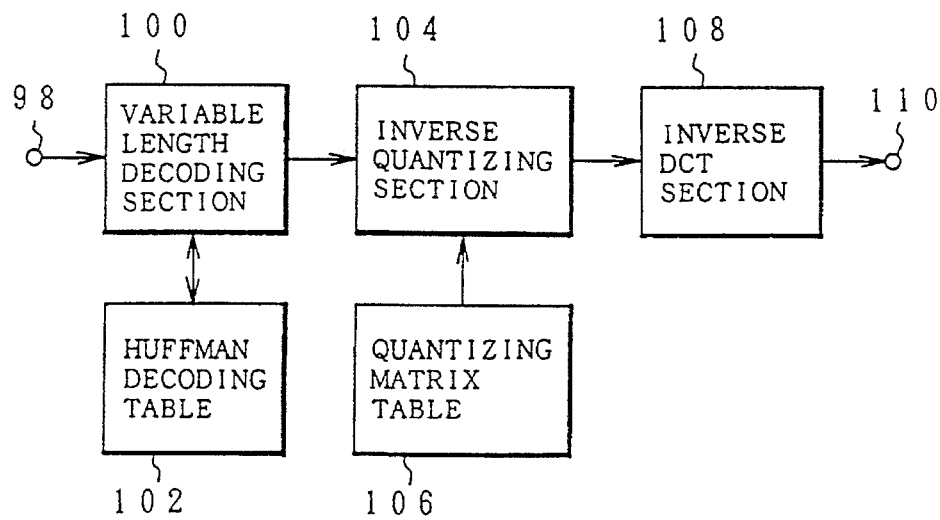
FIG. 11 is a block diagram showing the details of a decoding section in FIG. 10.

As shown in detail in FIG. 11, the decoding section 88 comprises: the input terminal 98; a variable length decoding section 100; a Huffman decoding table 102; an inverse quantizing section 104; a quantization matrix table 106; an inverse DCT section 108; and an output terminal 110. That is, the variable length decoding section 100 receives the encoded data of one block from the input terminal 98 and decodes the quantization DCT coefficients of fixed lengths by using the Huffman decoding table 102. The inverse quantizing section 104 multiplies quantization threshold values in the quantization matrix table 106 to the decoded quantization DCT coefficients and decodes the DCT coefficients. Finally, the pixel signals of one block are decoded by the inverse DCT section 108 and are generated. Referring again to FIG. 10, for example, a frame memory is used in the decoded image holding section 94. The pixel signals of 64 pixels, which were decoded by the decoding section 88 by accepting the address designation by the pixel addresses of 64 pixels [=(8 pixels in the vertical direction)×(8 pixels in the lateral direction)] constructing the decoding block which are generated from the address generating section 90, are written into the frame memory, thereby updating the image data of the decoding block. When the present decoding field is recognized from the designation field signal 95 from the decoding field designating section 92, the field copying section 96 copies the updating image data of the designation field image data for the decoded image holding section 94 as it is into the field image data of the non-designation field. The copying process to the non-designation field image data can be executed on a block unit basis in which the decoded image data is derived from the decoding section 88 or can be also performed on a field unit basis at the stage of completion of the decoding of one field.

Figure 12:
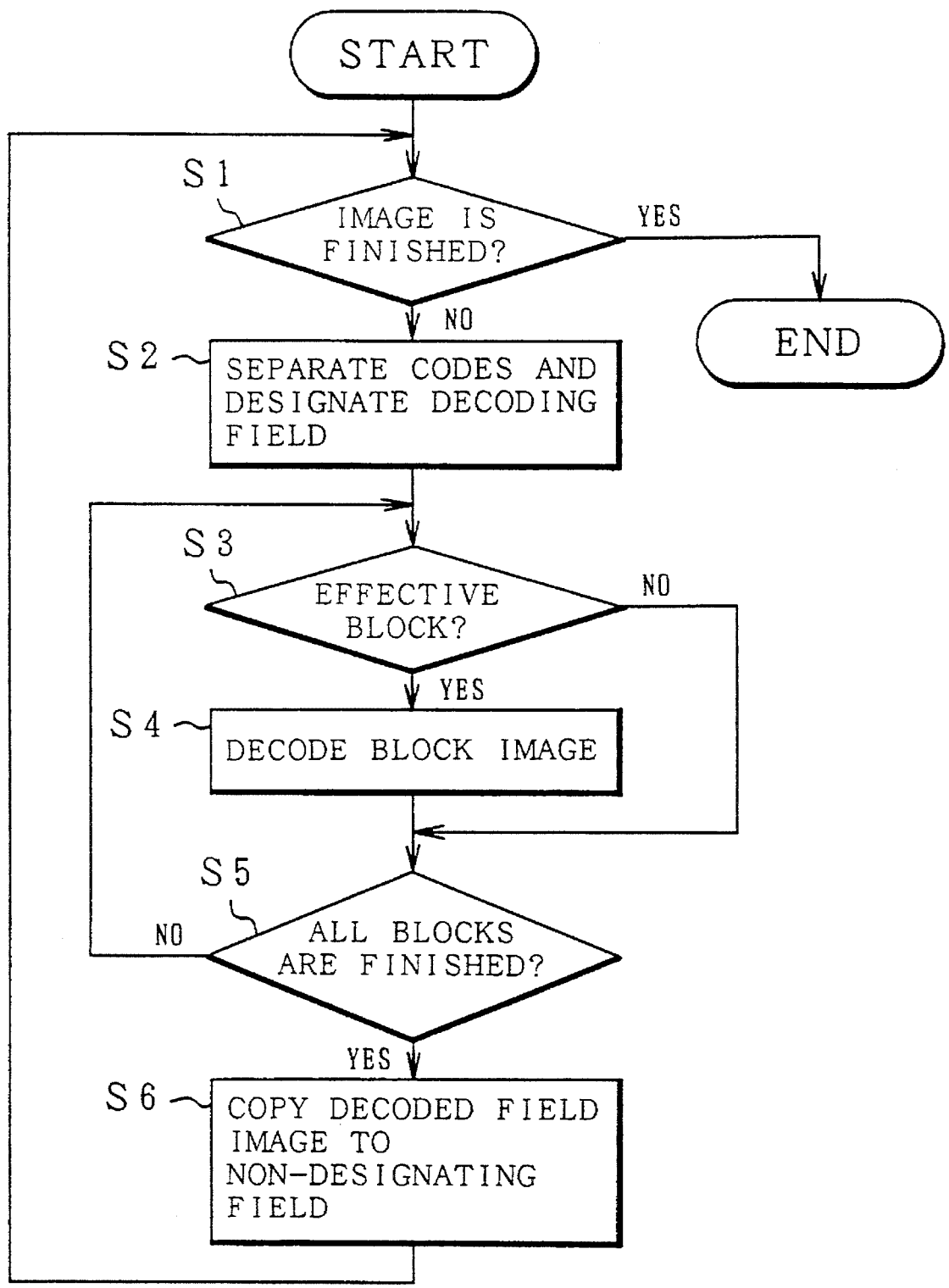
FIG. 12 is a flowchart showing a decoding process in FIG. 10.

A flowchart of FIG. 12 shows a decoding process in the first embodiment of the decoder of FIG. 10. First, in step S1, the presence or absence of the end of image is discriminated from the end of motion (EOM) code which is added to the last of the input moving image code data. The decoding processes in steps S2 to S6 are repeated until the end of image. In the decoding process, in step S2, first, the codes, block information, and field information which are included in the moving image code data are separated, the field information is decoded, and a decoding field is designated. Subsequently, whether the head block is an effective block or not is discriminated in step S3 from the separated encoded data with reference to the block information. When it is the effective block, the block image data is decoded from the corresponding encoded data in step S4. When it is an invalid block, the decoding of the block image data in step S4 is skipped. When the decoding processes of all of the blocks constructing one field are finished in step S5, the image data of the decoding field after completion of the updating is copied to the image data of the non-designation field. The processing routine is returned to step S1 and the process of the next frame is executed.

Figure 1:
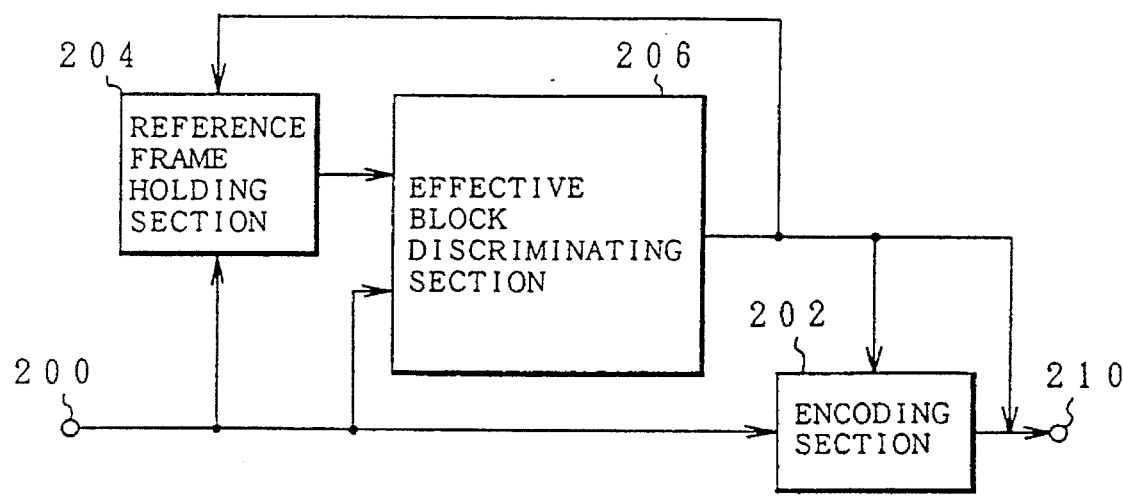
FIG. 1 is a block diagram of an encoder which has already been proposed by the inventors of the present invention.
Figure 2:
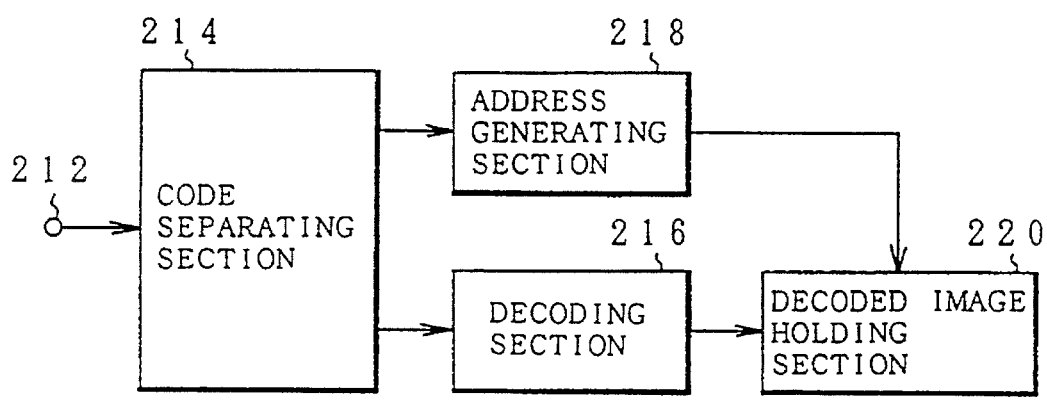
FIG. 2 is a block diagram of a decoder which has already been proposed by the inventors of the present invention.
Figure 13:
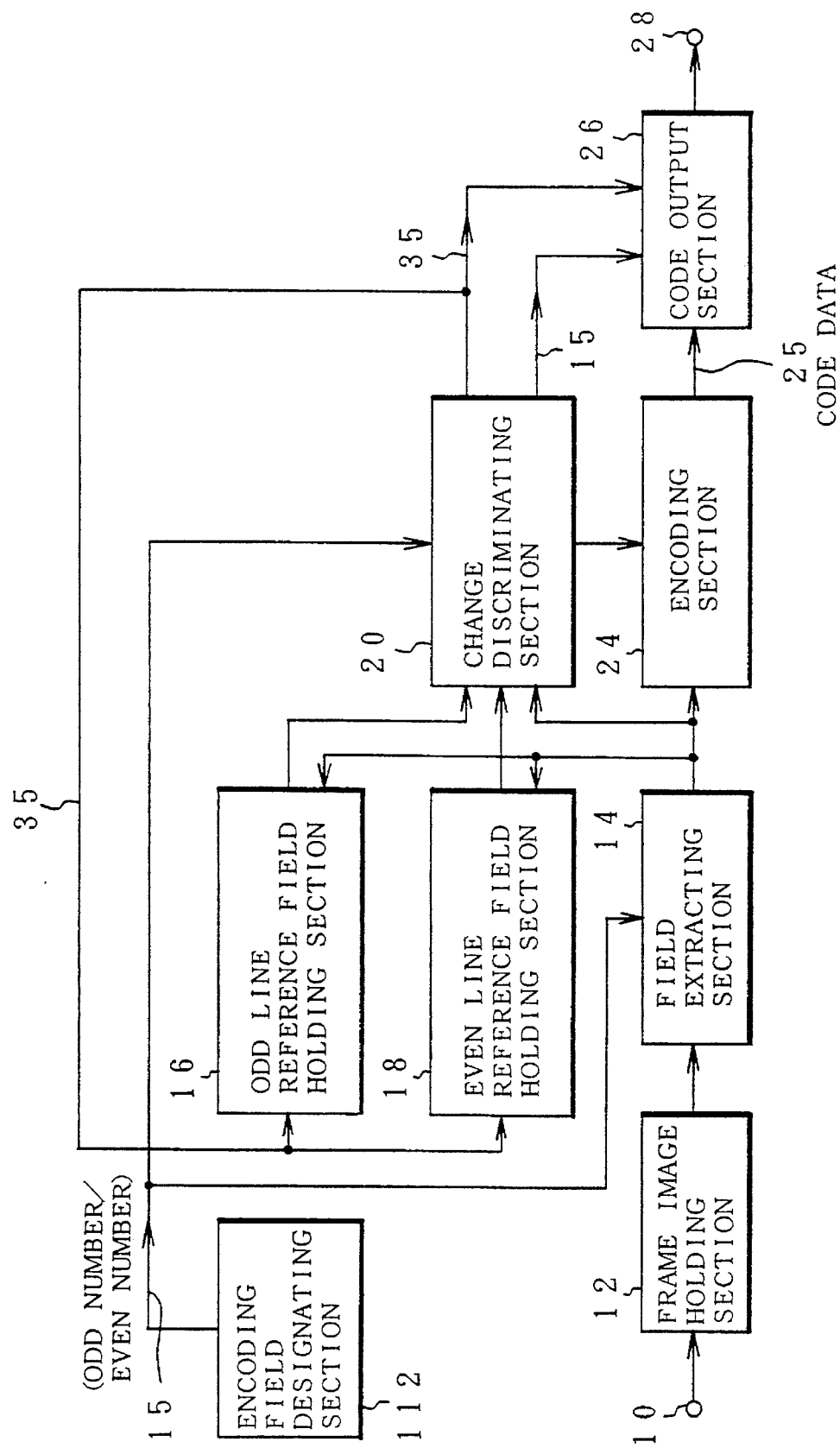
FIG. 13 is a block diagram showing the second embodiment of an encoder according to the invention.

FIG. 13 shows the second embodiment of an encoder of the present invention. The encoder of the second embodiment is characterized in that the odd field and the even field are alternately designated as an encoding field. That is, an encoding field designating section 112 alternately outputs the field designation signal 15 to designate the odd field and the even field to the field extracting section 14 and change discriminating section 20 every frame period. Therefore, the field extracting section 14 extracts, for example, the odd field image data at the first frame and, when it is judged by the change discriminating section 20 that the block is the effective block, it is encoded by the encoding section 24. In the next frame, the even field is extracted by the field extracting section 14 and only the block which was judged as an effective block by the change discriminating section 20 is encoded by the encoding section 24. A construction other than the encoding field designating section 112 to alternately designate the odd field and the even field is substantially the same as that of the first embodiment in FIG. 2.

Figure 14:
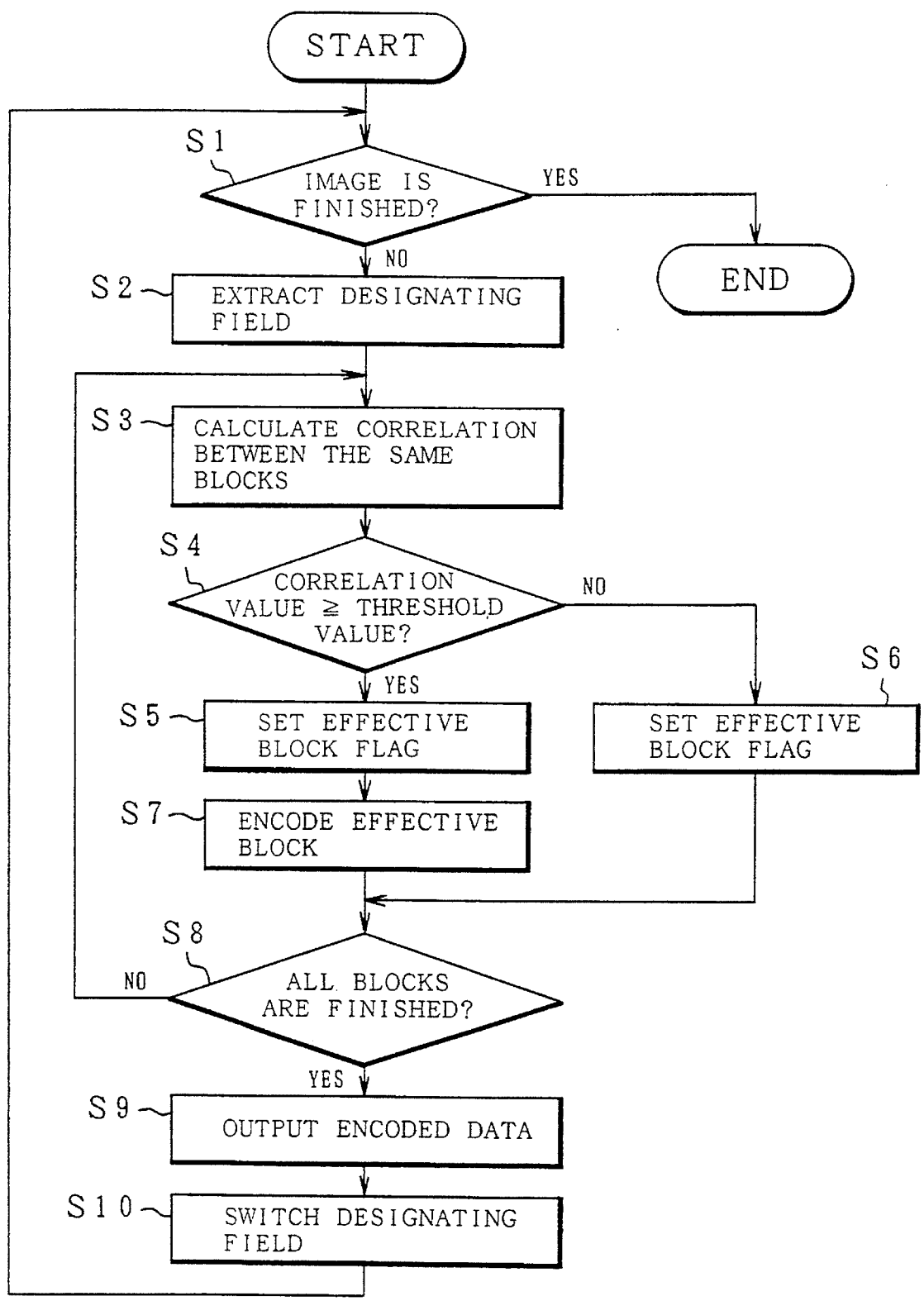
FIG. 14 is a flowchart showing an encoding process in FIG. 13.

A flowchart of FIG. 14 shows an encoding process according to the second embodiment of FIG. 13. In the encoding process, the processes in steps S1 to S9 are similar to those in steps S2 to S10 in case of fixedly designating the encoding field shown in FIG. 9. After completion of the encoding process of one field in steps S2 to S9, the present designation field is switched to another designation field in step S10. For example, when the odd field is first designated, the designation field is next switched to the even field. Therefore, the encoding is alternately executed for the odd field and the even field.

On the other hand, as a decoder for decoding the moving image code data sent from the encoder according to the second embodiment of FIG. 14, the decoder in the first embodiment shown in FIG. 10 can be directly used and the decoding process is also substantially the same as that shown in the flowchart of FIG. 12. According to the processes of the decoder shown in FIGS. 10 and 12, the decoding of the odd field and the decoding of the even field are alternately designated by the encoded data. When the odd field is decoded, the image data of the decoded odd field is directly copied to the even field, thereby enabling one frame image to be displayed. In case of decoding the even field, the decoded even field is copied to the odd field image data, thereby enabling the image of one frame to be displayed.

A time chart of FIG. 15 shows processes on the encoding and decoding sides according to the second embodiment of the decoder shown in FIG. 13. First, on the encoding side, as shown in the frame numbers n−1, n, n+1, and n+2, the extraction and encoding of an odd field image 114, the extraction and encoding of an even field image 116, the extraction and encoding of an odd field image 118, and the extraction and encoding of an even field image 120 are executed. In the decoding process using the moving image code data in association with such an encoding, as shown in the frame numbers n−1, n, n+1, and n+2 on the decoding side, an odd field image 124, an even field image 126, an odd field image 128, and an even field image 130 are decoded from the corresponding code data.

Figure 16A:
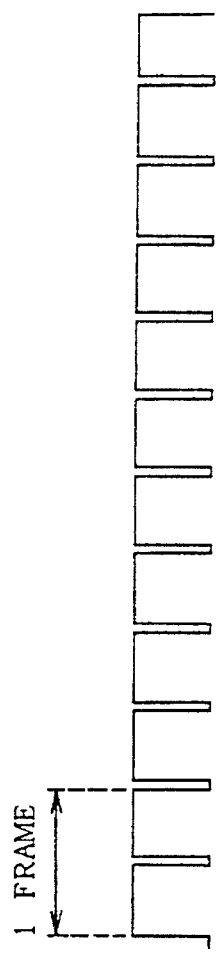
FIGS. 16A and 16B are time charts showing an encoding of alternating fields according to the second embodiment in FIG. 13 in comparison with a frame encoding.
Figure 16B:
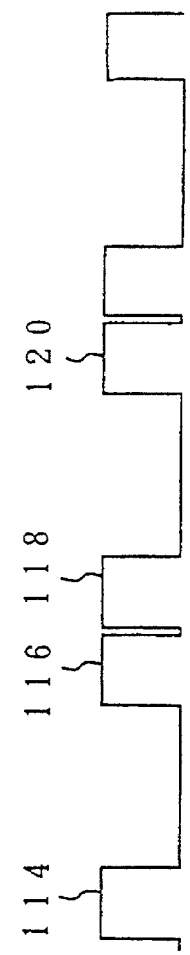

FIG. 16A shows an encoding by the field switching in FIG. 15. As compared with the encoding of the frame image data shown in FIG. 16A, according to the encoding of the alternate field shown in FIG. 16B such that an odd field and an even field are alternately designated and encoded, for example, when making correspond to the field image data on the encoding side in FIG. 15, the odd field image 114 is encoded at the first frame period, the even field image 116 is encoded at the next frame period, the odd field image 118 is subsequently encoded, and the even field image 120 is subsequently encoded. In this manner, the field images are alternately encoded. According to the first embodiment in which the encoding field is fixedly designated, since the half of the present image is field encoded and sampled, in the case where a state such that the number of transmission frames per unit time cannot be assured always continues, a deterioration of the picture quality becomes conspicuous when only the fixed field image is used, and an information amount which the image inherently has drops. On the other hand, by alternately encoding the odd field and the even field as in the second embodiment, the spatial drop-out of the information amount can be prevented.

Figure 17:
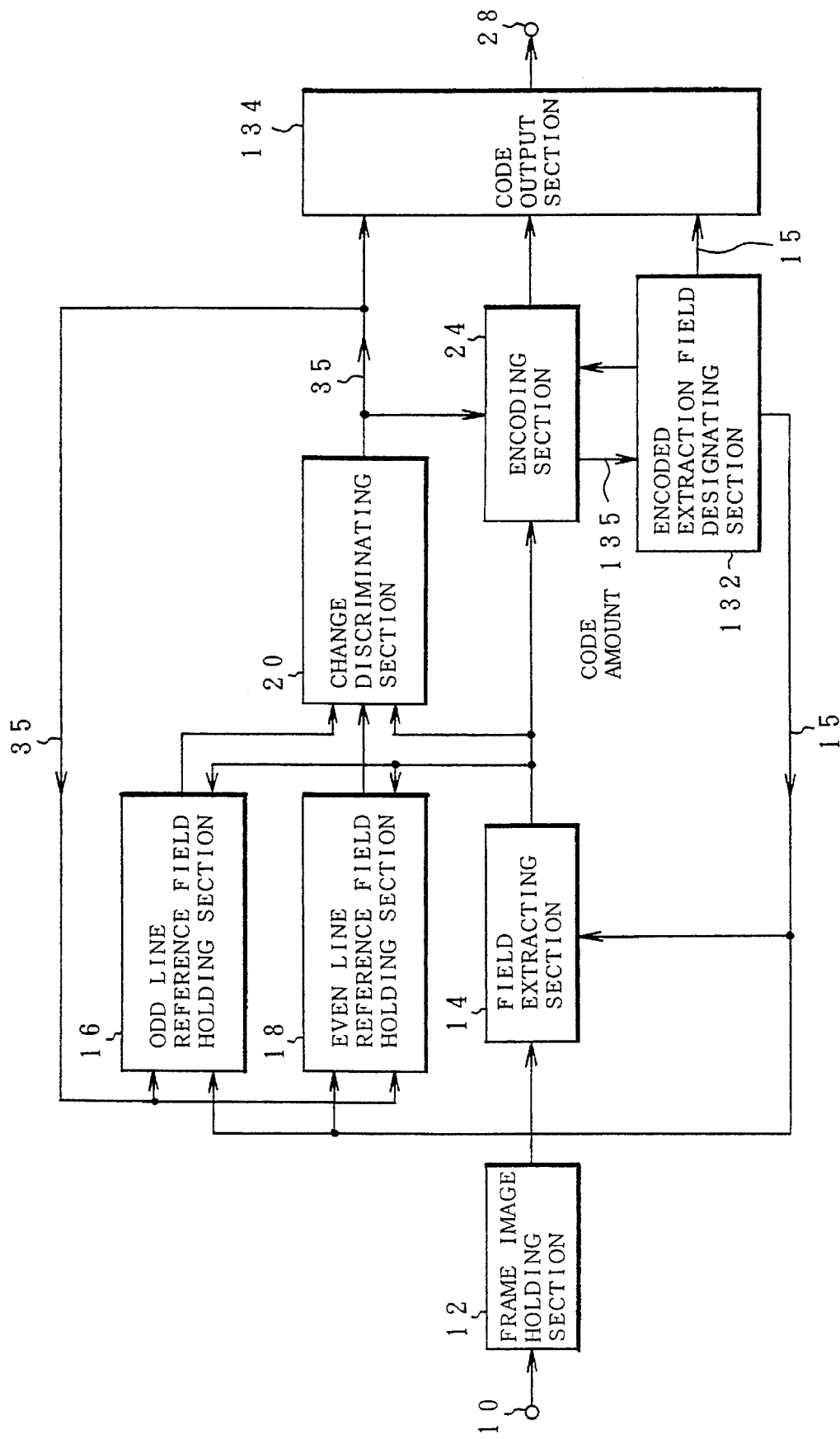
FIG. 17 is a block diagram showing the third embodiment of an encoder of the present invention.
Figure 18:
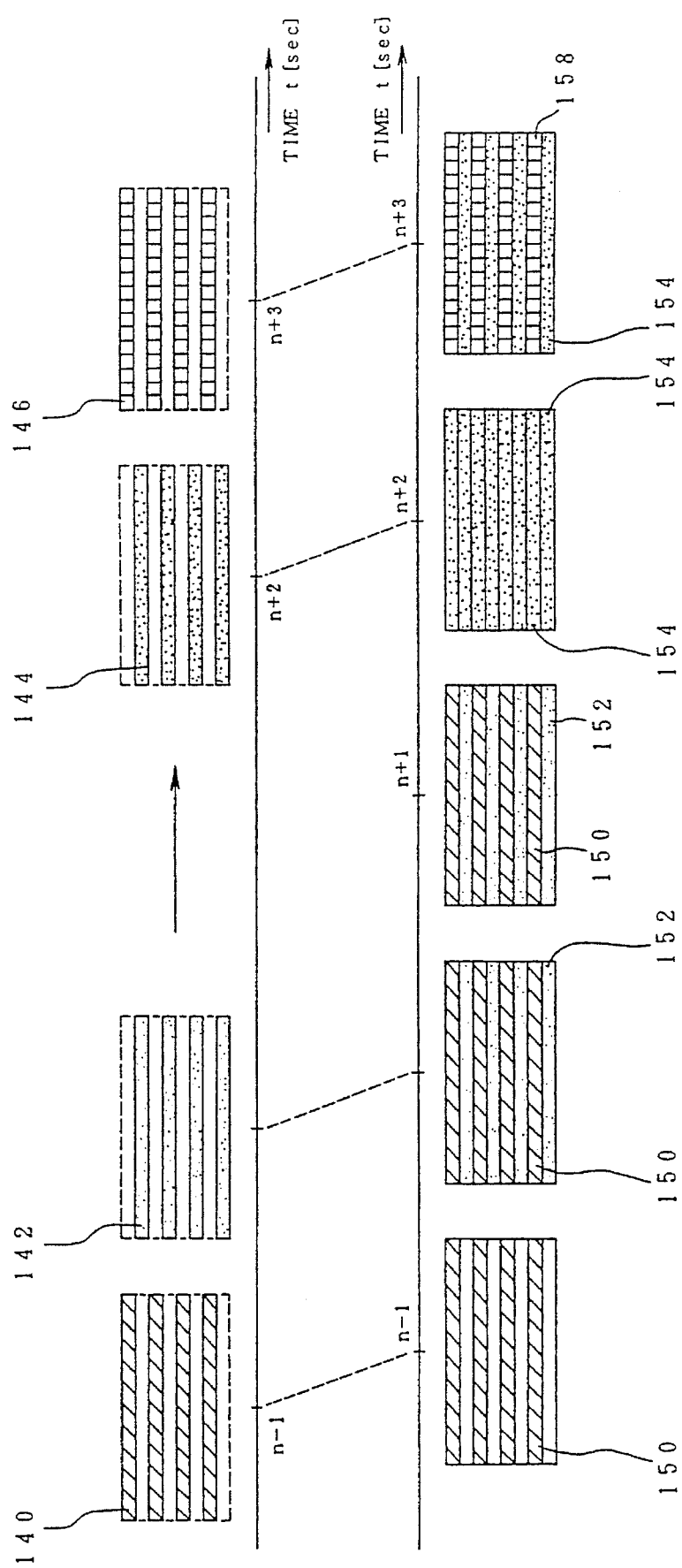
FIG. 18 is a time chart showing a field encoding and a decoding according to FIG. 17.

FIG. 17 shows the third embodiment of an encoder according to the invention. In addition to the encoding process of the alternate field of the odd field and even field shown in the second embodiment, the encoder of the third embodiment is characterized in that an image deterioration due to a difference of the fields between the odd field and the even field in the case where a sudden change occurs in the image is prevented. An encoding extraction field designating section 132 is newly provided in the third embodiment in which the picture quality deterioration due to the difference between the field images when a severe image change occurs is prevented. The encoding extraction field designating section 132 designates a field as a target to be encoded at the present frame on the basis of a magnitude of a code amount 135 of the code data in the previous frame by the encoding section 24. The above process will now be specifically explained as follows with respect to the encoding side of a time chart of FIG. 18. In the encoding of an even field image 142 in the (n)th frame after an odd field image 140 was encoded at the (n−1)th frame, it is now assumed that the code amount increases due to a sudden change of the image and, even after the period of the (n)th frame was finished, the encoding and transmission are not finished. An amount of codes which can be encoded and transmitted at one frame period is previously decided as a threshold value. When the code amount of the code data exceeds a threshold value, it is possible to judge that the code amount increases and the encoding and transmission are not finished within the frame period. When the code amount exceeds the threshold value and increases as shown in the (n)th frame, the encoding and transmission are skipped with respect to the next (n+1)th frame. In the designation of the encoding field of the (n+2)th frame after completion of the encoding and transmission of the (n)th frame, a same even field image 144 as the even field image 142, which was designated by the (n)th frame as a previous frame in which the encoding was performed, is designated as a target to be encoded.

On the other hand, when considering the decoding side, with respect to the (n−1)th frame and the (n)th frame, an odd field image 150 and an even field image 152 are alternately decoded. With regard to the (n+1)th frame in which the encoding was thinned out, the even field image 152 of the (n)th frame is maintained as it is. As for the (n+2)th frame in which the same field as the present frame was encoded, a corresponding even field image 154 is decoded from the code data and, at the same time, the even field image 154 which was decoded to the odd field image as a non-designation field is copied as it is. Therefore, in the decoded image just after the code amount exceeded the threshold value and increased, the frame image in which the same even field image is possessed in the odd field is displayed and there is no difference of the pixel signals between the fields. Therefore, the deterioration of the picture quality due to the field difference can be prevented.

Further, in the (n+3)th frame, since the code amount is smaller than the threshold value, the image is switched to the designation of an odd field image 146 and the processing mode is returned to the encoding and decoding by the alternate field. Therefore, a resolution of the frame image is recovered due to the alternate encoding and decoding of the odd field and even field.

Figure 19:
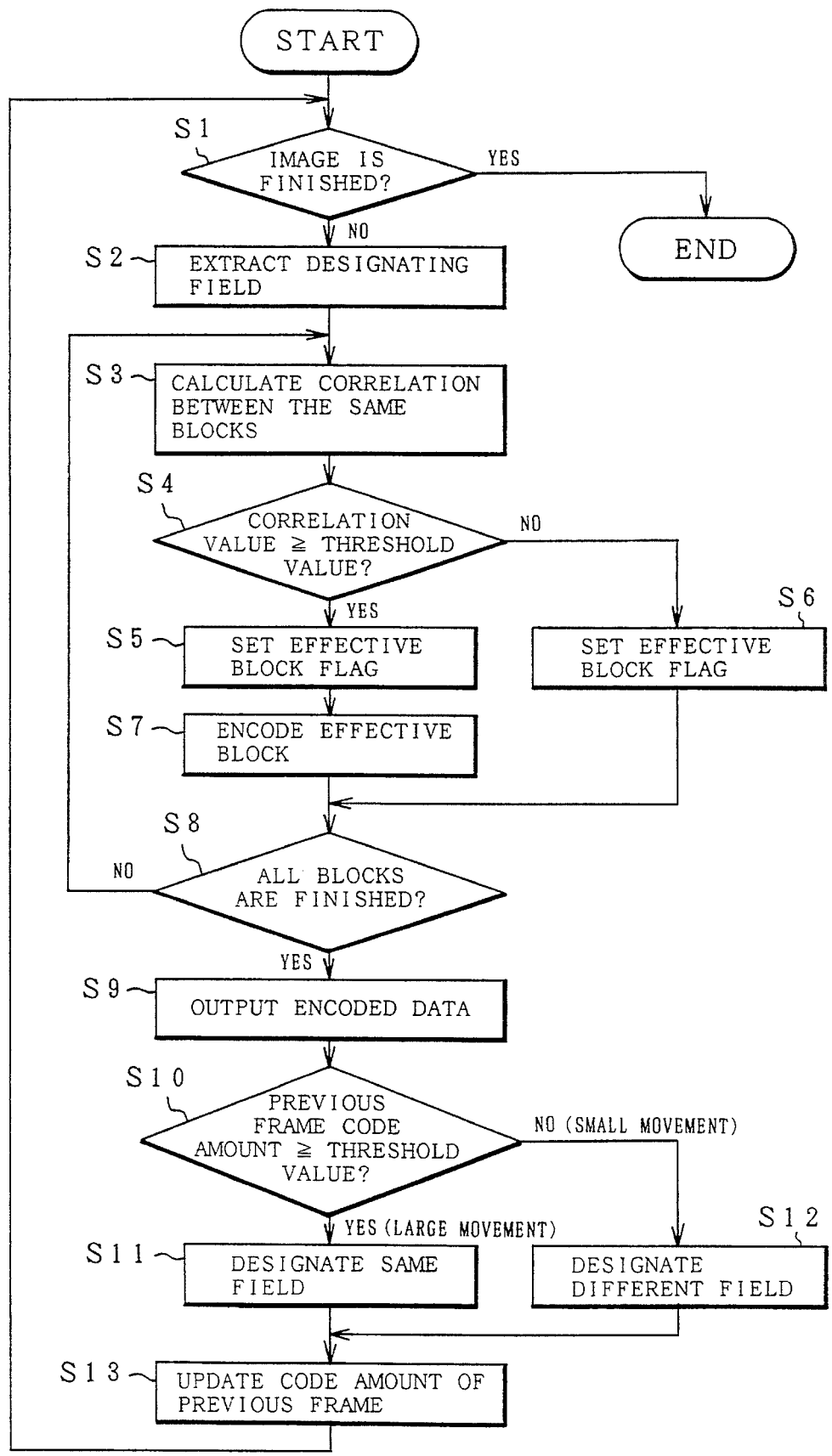
FIG. 19 is a flowchart showing an encoding process in FIG. 17.

A flowchart of FIG. 19 shows an encoding process of the third embodiment of an encoder of the invention. Encoding processes in steps S1 to S9 are substantially the same as the encoding processes of the alternate field in the second embodiment shown in FIG. 14. In step S10 and subsequent steps after completion of the encoding of one field, first, a check is made in step S10 to see if the code amount of the previous frame is equal to or larger than the threshold value or not. In this instance, when there is an extreme image movement, the code amount increases and exceeds a threshold value of the amount of codes which can be encoded and transmitted within the frame period, and the same field as the field designated by the previous frame is designated. On the other hand, when the code amount of the previous frame is smaller than the threshold value, the movement of the image is small. Therefore, for the alternate field encoding, a different field is designated in step S12 and the field switching is executed. Subsequently, in step S13, the code amount of the previous frame is updated by the code amount of the present frame. The processing routine is returned to step S1 and the process of the next frame is executed.

Figure 20:
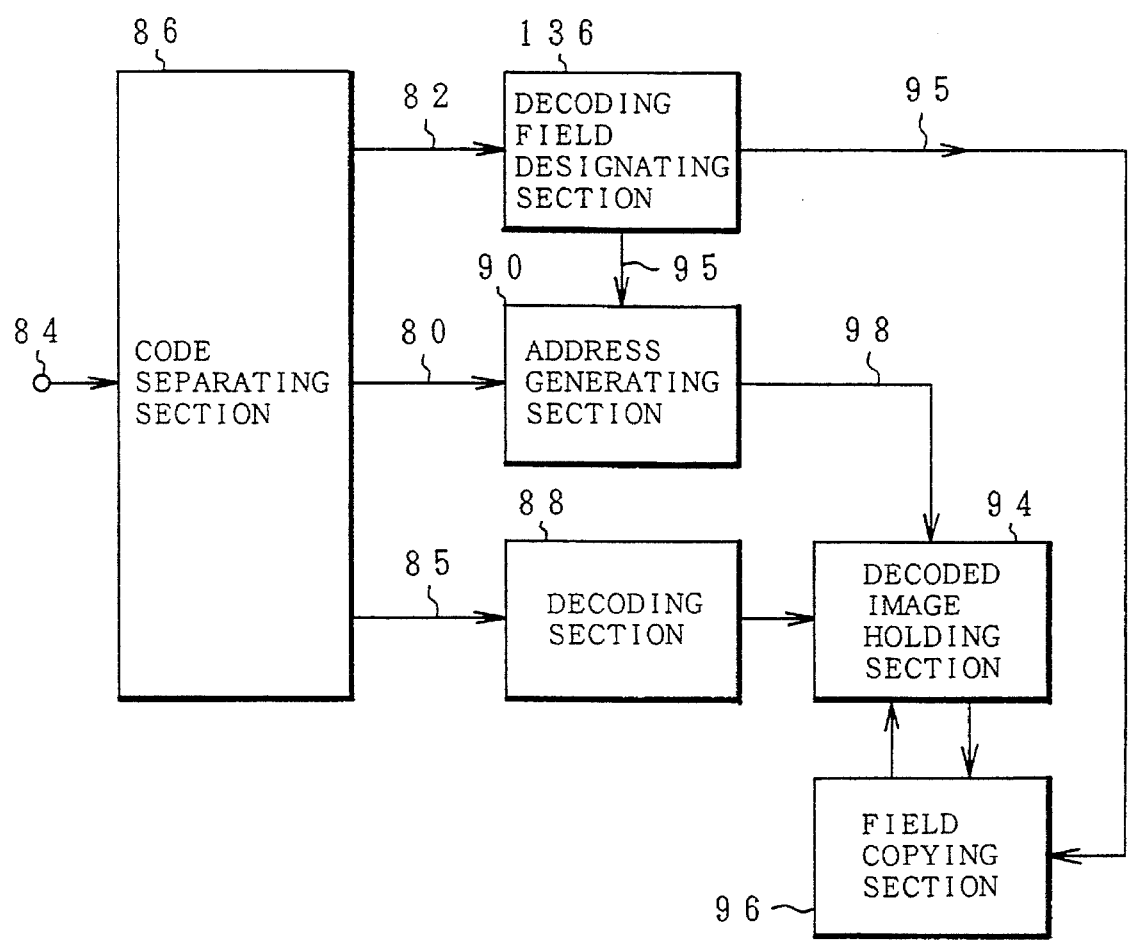
FIG. 20 is a block diagram showing the third embodiment of a decoder of the present invention in correspondence to the encoder in FIG. 17.

FIG. 20 shows the third embodiment of a decoder for decoding an image from the moving image code data sent from the third embodiment of the encoder in FIG. 17. The third embodiment of the decoder is characterized in that in the case where the designation of the decoding of the same field as the previous frame is discriminated from the field information 82 separated by the code separating section 86, the decoding field image data which was updated by the decoded image holding section 94 is copied to the non-designation field image data.

Figure 21:
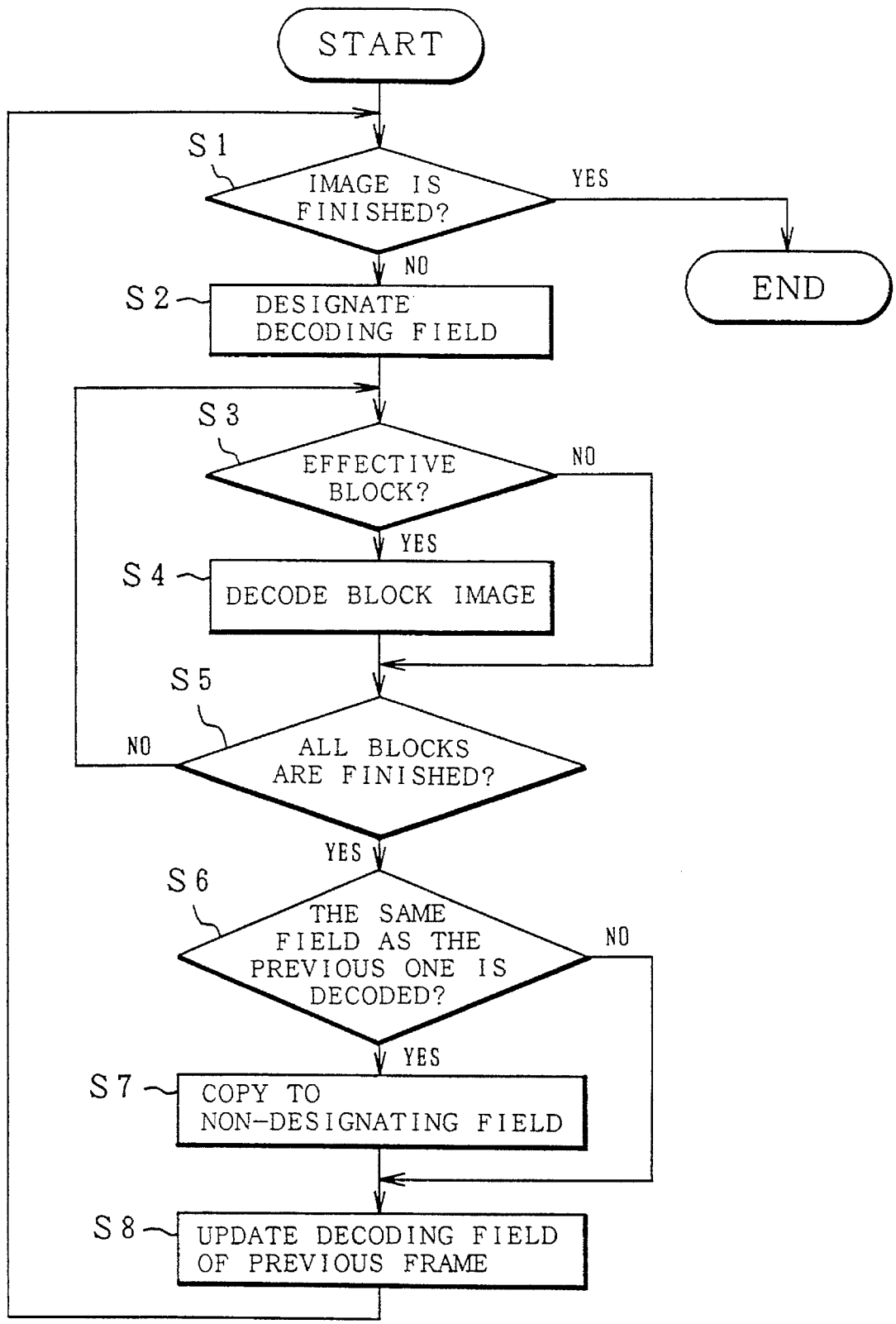
FIG. 21 is a flowchart showing a decoding process in FIG. 20.

A flowchart of FIG. 21 shows a decoding process of the decoder in FIG. 20. First, the decoding processes of the field image data in steps S1 to S5 are substantially the same as those in the first embodiment shown in FIG. 11. When the decoding of the image of one field is finished in step S5, a check is made in step S6 to see if the same designation field as that of the previous time has been decoded or not. In case of the decoding of the same field, in step S7, the decoding field of the present frame is copied to the non-designation field. In case of the field different from the previous time, the copy to the non-designation field in step S7 is skipped. Subsequently, the field information of the previous frame is updated to the field information at the present time point in step S8. The processing routine is returned to step S1 and the process of the next frame is executed.

Figure 22:
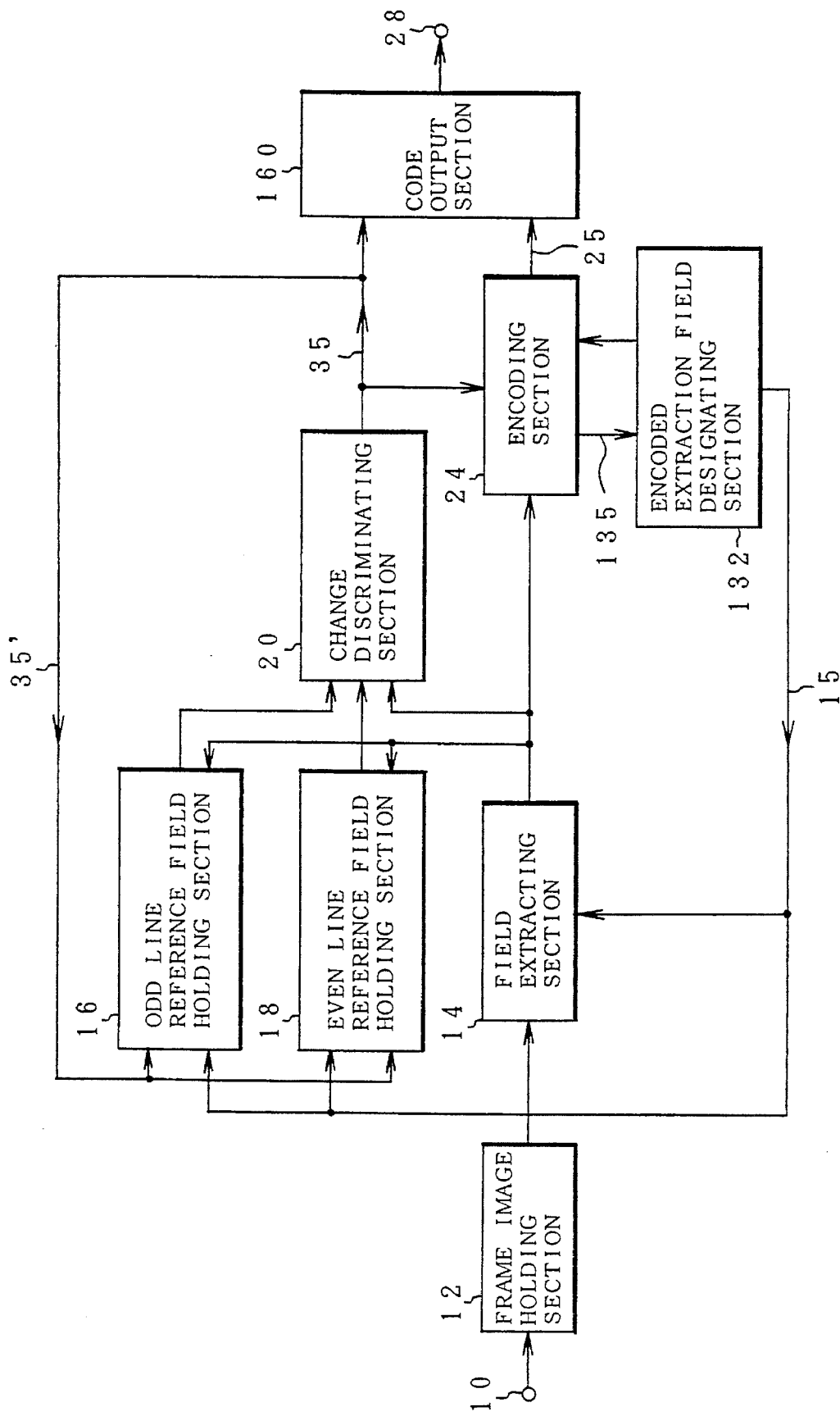
FIG. 22 is a block diagram showing the fourth embodiment of an encoder of the present invention.
Figure 23:
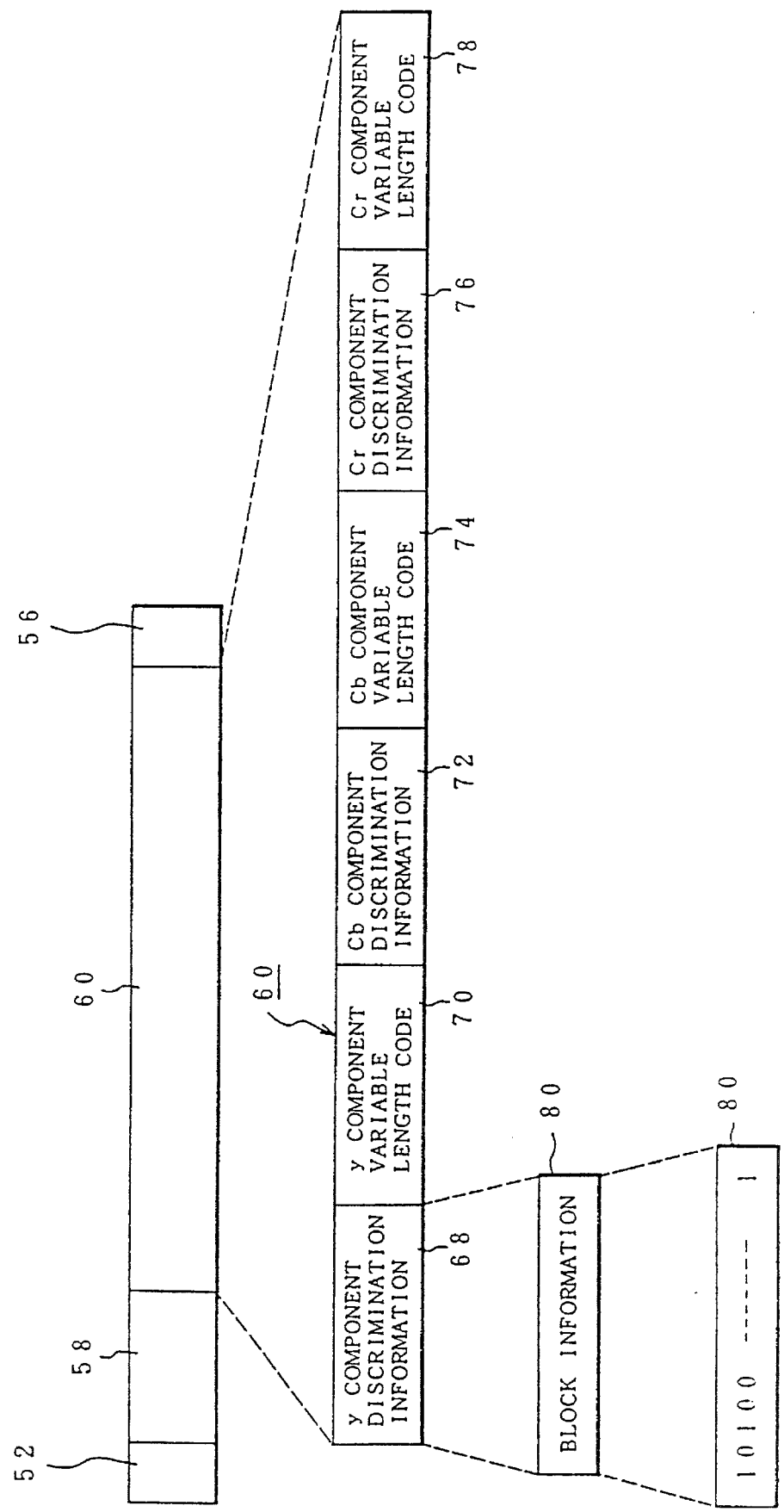
FIG. 23 is an explanatory diagram of a format showing the details of data of one field which is used in the fourth embodiment of FIG. 21.

FIG. 22 shows the fourth embodiment of an encoder of the invention. The fourth embodiment is characterized in that the field information is not added to the encoded data and block information 35 in the third embodiment of FIG. 17 but the designation field is individually discriminated from the code amount of the encoded data on the decoding side. Therefore, as shown in FIG. 23, in the moving image code data which is sent from a code output section 160 of the encoder in FIG. 22, only the block information 80 indicating whether the block is the effective block or the invalid block is included in, for example, the y component discrimination information 68 and the field information 82 as shown in FIG. 6 is eliminated.

Figure 24:
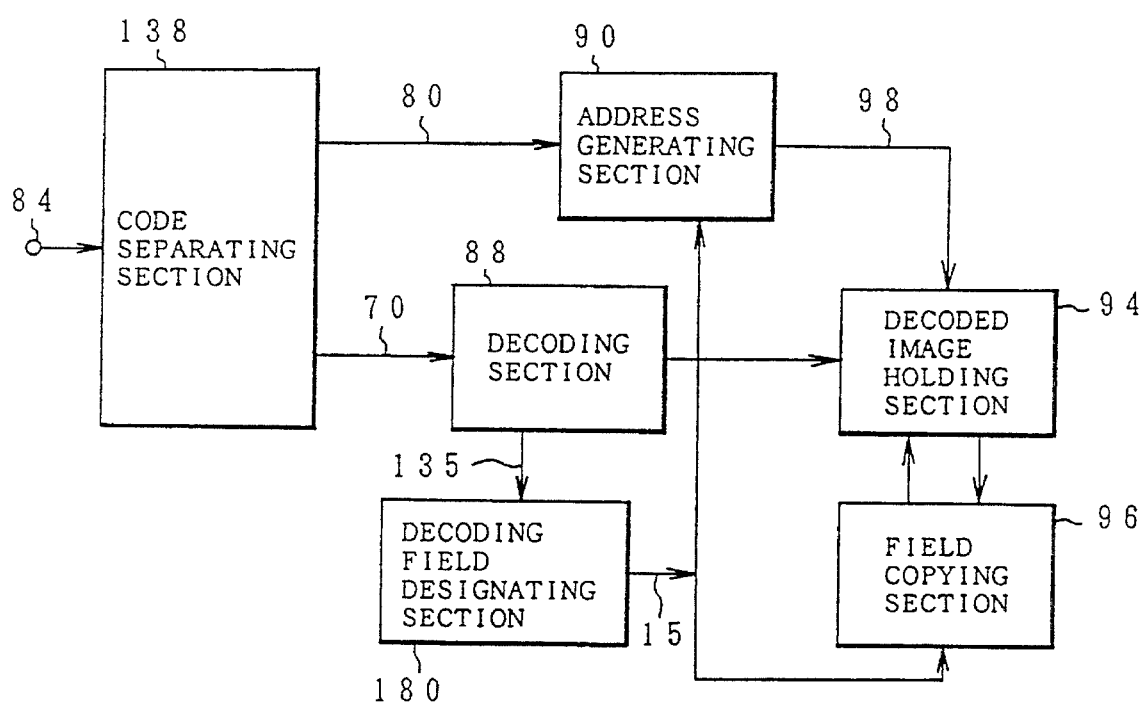
FIG. 24 is a block diagram showing the fourth embodiment of a decoder of the present invention corresponding to the encoder in FIG. 22.

FIG. 24 shows the fourth embodiment of a decoder to decode the moving image code data sent from the encoder in FIG. 22. The decoder of the fourth embodiment is characterized in that the decoding field can be individually designated by a decoding field designating section 180 without needing the field information from the encoding side. That is, the amount of codes which can be encoded and transmitted at one frame period on the encoding side and a threshold value have previously been set in the decoding field designating section 180. The code amount signal 135 is given from the decoding section 88 to the decoding field designating section 180. The code amount of one field is obtained and compared with a threshold value. When the obtained code amount is smaller than the threshold value, the encoding side recognizes that the alternate field encoding has been performed, so that the odd field and the even field are alternately designated by the field designation signal 15. On the other hand, when the code amount of one field is equal to or larger than the threshold value, the encoding side judges that the same field was continuously designated due to an increase in code amount by a sudden image change, so that the field designation signal to designate the same field as the previous frame is output to the address generating section 90. The field designation signal 15 to designate the same field is also given to the field copying section 96. The field copying section 96 copies the field decoded image data which was decoded and held in the decoded image holding section 94 to the non-designation field image data.

Figure 25:
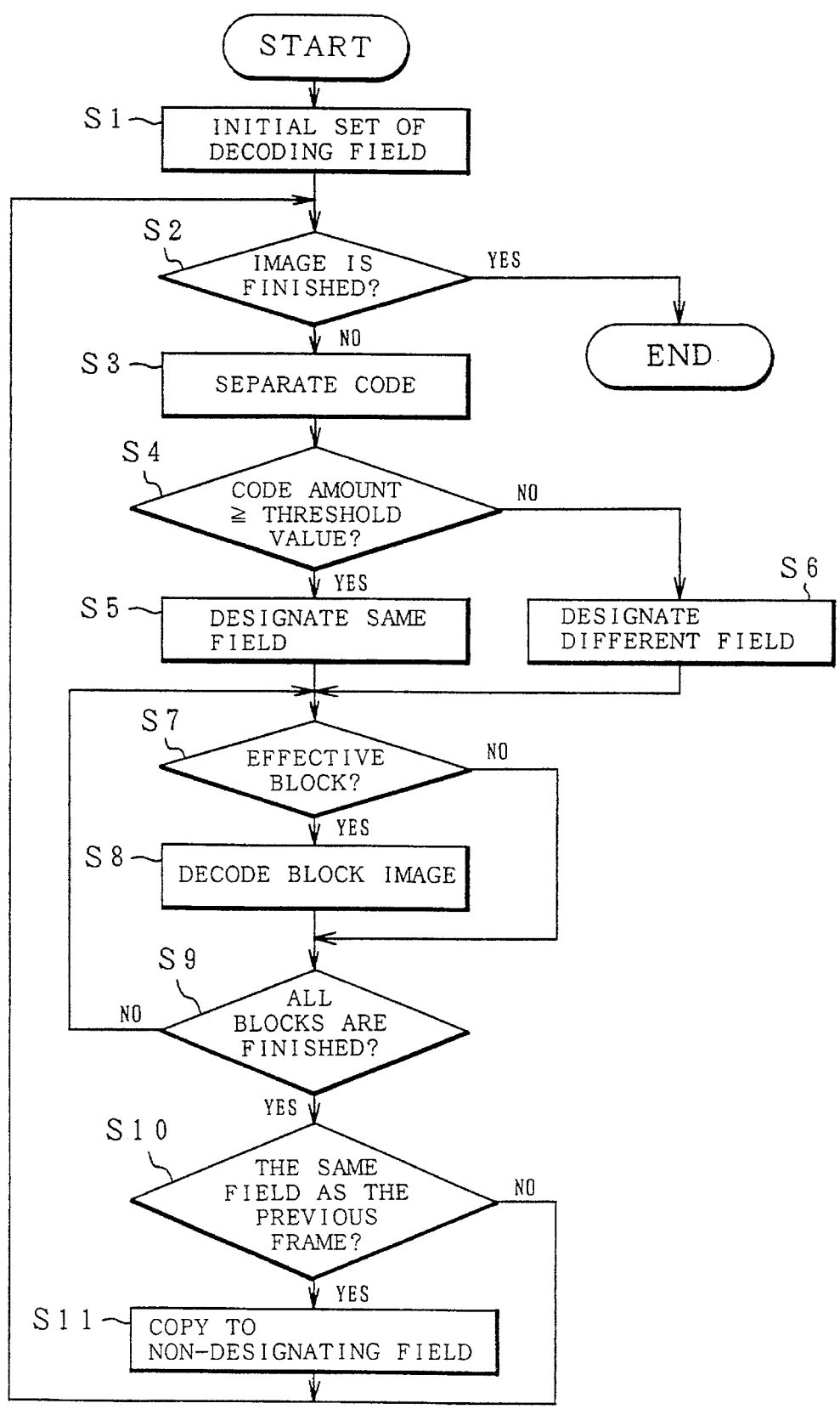
FIG. 25 is a flowchart showing a decoding process in FIG. 24.

A flowchart of FIG. 25 shows a decoding process in the fourth embodiment of FIG. 24. First, in step S1, the decoding field of the head frame is initialized. For example, in case of starting the encoding from the odd field on the encoding side, the same odd field is initialized in step S1. In step S2, the end of image is checked from the end of motion (EOM) code. The decoding processes in step S3 and subsequent steps are repeated until the end of image. In step S3, the encoded data is separated and the code amount is known from the separated header. In step S4, a check is made to see if the code amount is equal to or larger than the threshold value or not. When the code amount is equal to or larger than the threshold value, in step S5, the same field as the previous frame is designated as a decoding field. When the code amount is smaller than the threshold value, in step S6, a field different from the previous frame is designated as a decoding field for the purpose of decoding of the alternate field. Subsequently, a check is made in step S7 to see if the previous block constructing the designating field in steps S6 to S9 is the effective block or not. If YES, the process to decode the block image data in step S8 is repeated until the end of all blocks in step S9. After the decoding of the field image data was finished, a check is made in step S10 to see if the field is the same field as the previous frame or not. If YES, the image data of the decoding field is copied to the non-designation field in step S11. In case of a different field, the copy to the non-designation field in step S11 is skipped. In the encoding and decoding of the fourth embodiment of the invention as mentioned above, when the code amount is small, the encoding and transmission are executed without causing a deterioration of the resolution by the encoding of the alternate field. On the other hand, when the code amount increases and the number of frames which are transmitted per unit time decreases, the decoding field is copied to the non-decoding field and the deterioration of the image due to the field difference can be prevented. Further, the transmission code amount can be reduced by an amount corresponding to that the field information indicative of the designation field is not transmitted from the encoding side.

According to the invention, the field image data is encoded and transmitted in place of the frame image data, the image data of the decoding field which was decoded is copied to another field, and the frame image data is decoded, thereby reducing the information amount of the present image to ½. Thus, an amount of codes to be encoded and transmitted can be remarkably reduced into about ½. By alternately encoding and transmitting and decoding the odd field and the even field, a moving image transmission in which an information amount of the present image was reduced without deteriorating the resolution can be realized. Further, as for an increase in code amount due to a sudden image change, by designating the same field as the previous frame and by copying the decoded frame image data to the non-decoding field, the deterioration of the picture quality due to the aging positional deviation of the field image data can be prevented. Further, the encoding transmission and the decoding of the field image according to the invention can absorb the sudden increase in code amount and is also effective, particularly, for the transmission of the moving image on the transmission line of a narrow transmission band.

The above embodiments can be realized by any one of the hardware construction and the software construction.

Although the above embodiments have been shown and described with respect to an example of the encoding and decoding of color difference spaces of y, Cb, and Cr components, the invention can be also similarly applied to a proper color space such as RGB space, (L*, a*, b*) space (brightness, saturation, hue space), or the like.

Further, the construction of the frame image data due to the odd field and even field is not limited to the NTSC system but can be also applied to the PAL system. The invention, further, is not limited by the numerical values shown in the above embodiments.

What is claimed is:

1. A compressing method of image data, comprising:
   an image holding step of holding image data which is continuously input on a frame unit basis;
   a compressing field designating step of designating either one of the image data of an odd field and the image data of an even field which are targets to be compressed;
   a field image extracting step of extracting the image data of the odd field or the image data of the even field from present frame image data held in said image holding step on the basis of the result of the designation in said compressing field designating step;
   a reference field holding step of holding reference field image data every field;
   a change discriminating step of obtaining a correlation between the image regarding the field image data which was extracted from the present frame image data in said field extracting step and the image at the same position of the reference field image data held in said reference field holding step every block which is obtained by dividing the field image data into blocks on a unit basis of a plurality of pixels and discriminating whether the block is an effective block indicating that said block changes or an invalid block indicative of no change on the basis of a value of said correlation;
   a compressing step of compressing only the field image data of each block which was judged to be the effective block in said change discriminating step; and
   a code output step of adding block information which indicates whether each block is an effective block or an invalid block and was obtained as a result of the discrimination of said change discriminating step to field encoded data of one field which was obtained in said compressing step and outputting the resultant data.

2. A method according to claim 1, wherein in said compressing field designating step, either one of the image data of the odd field and the image data of the even field which are the targets to be compressed is fixedly designated.

3. A method according to claim 1, wherein in said compressing field designating step, the designation of the image data of the odd field or the image data of the even field which are the targets to be compressed is alternately switched every other frame.

4. A method according to claim 1, wherein in said compressing field designating step, in the case where a code amount of a previous frame is less than a predetermined threshold value, the image data of a field different from the field compressed in the previous frame is designated as a target to be compressed, and in the case where the code amount of the previous frame exceeds said predetermined threshold value, the image data of the same field as the field encoded in the previous frame is designated as a target to be compressed.

5. A method according to claim 1, wherein in said change discriminating step, the sum of the absolute values of differences between the respective pixel signals at the same position of the field image data of the present frame and the image data of the reference field is calculated as a correlation value every block, and when said correlation value is equal to or larger than a predetermined threshold value, said block is judged to be an effective block.

6. A method according to claim 1, wherein in said output step, said block information is added to the field encoded data of one field obtained in said compressing step and field information indicative of the compressing field is added to said field encoded data and the resultant data is output.

7. A method according to claim 1, wherein in said output step, the block information obtained in said change discriminating step is compressed and output.

8. A compressing apparatus of image data, comprising:

image holding means for holding image data which is continuously input on a frame unit basis;

compressing field designating means for designating either one of the image data of an odd field and the image data of an even field which are targets to be compressed;

field image extracting means for extracting the image data of the odd field or the even field from the image data of the present frame held in said image holding means on the basis of the result of the designation of said compressing field designation means;

reference field holding means for holding reference field image data every field;

change discriminating means for obtaining a correlation value between the image regarding the field image data extracted from the image data of the present frame by said field extracting means and the image at the same position of the reference field image data held in said reference field holding means every block which is obtained by dividing the field image into blocks on a unit basis of a plurality of [(m in the vertical direction)× (n in the lateral direction)] and discriminating whether the block is an effective block indicating that said block changes or an invalid block indicative of no change on the basis of said correlation value;

compressing means for compressing only the field image data of each block which was judged as an effective block by said change discriminating means; and code output means for adding block information of one field which indicates whether each block is an effective block or an invalid block and which was obtained as a result of the discrimination by said change discriminating means to the encoded data of one field from said compressing means and for outputting the resultant data.

9. An apparatus according to claim 8, wherein said compressing field designating means fixedly designates either one of the image data of the odd field and the image data of the even field which are the targets to be compressed.

10. An apparatus according to claim 8, wherein said compressing field designating means alternately switches every other frame the designation of the image data of the odd field or the image data of the even field which are the targets to be compressed.

11. An apparatus according to claim 8, wherein in the case where the code amount of the previous frame is equal to or less than the predetermined threshold value, said compressing field designating means designates the image data of a field different from the field compressed in the previous frame as a target to be compressed, and in the case where the code amount of the previous frame exceeds the predetermined threshold value, said compressing field designating means designates the image data of the same field as the field compressed in the previous frame as a target to be compressed.

12. An apparatus according to claim 8, wherein said change discriminating means calculates the sum of the absolute values of differences between the respective pixel signals at the same position of the field image data of the present frame and the reference field image data every block and judges that the block is the effective block when said correlation value is equal to or larger than the predetermined threshold value.

13. An apparatus according to claim 8, wherein said output means adds only the block information to the field encoded data of one field obtained by said compressing means and outputs the resultant data.

14. An apparatus according to claim 8, wherein said output means adds only the block information to the field encoded data of one field obtained by said compressing means and outputs the resultant data.

15. An apparatus according to claim 8, wherein said output means encodes the block information obtained by said change discriminating means into predetermined encoded data and outputs.

16. A decompressing method of image data for continuously decompressing image data, comprising:

an input step of inputting data including encoded data of one field, block information indicative of the presence or absence of an effective block of a field image, and field information indicative of a compressing field;

a reconstructed image holding step of holding reconstructed field image data every field;

code separating means for separating the field encoded data, block information, and field information from said input data;

a decompressing step of decompressing the field image data from the field encoded data separated in said code separating step;

an updating step of updating a relevant region of the reconstructed field image data held in said reconstructed image holding step by the address designation based on the block information and the field information which were separated in said code separating step; and a field copying step of copying the reconstructed field image data of the present frame which was updated in said updating step to another field image data which is not at present a target to be decompressed in the case where the decompressing field of the present frame is the same as the decompressing field from the field information separated in said code separating step.

17. A decompressing apparatus of an image data for continuously decompressing image data, comprising:

input means for inputting data including encoded data of one field, block information indicative of the presence or absence of said field image data, and field information indicative of a compressing field;

reconstructed image holding means for holding the reconstructed field image data every field;

code separating means for separating said field encoded data, block information, and field information from the input data;

decompressing means for decompressing the field image data from the field encoded data which was separated by said code separating means;

updating means for updating a relevant region of the reconstructed field image data held in said reconstructed image holding means by the address designation based on the block information and field information which were separated by the code separating means; and field copying means for copying the decompressed field image data of the present frame which was updated by said updating means to another field image data which is not at present a target to be decompressed in the case where the decompressing field of the present frame is the same as the decompressing field from the field information data which was separated by the code separating means.

18. A decompressing method of an image data for continuously decompressing image data, comprising:

an input step of inputting data including encoded data of one field, block information indicative of the present or absence of an effective block of said field image data, and field information indicative of a compressing field;

a reconstructed image holding step of holding the deconstructed field image data every field;

a code separating step of separating said field encoded data and block information from the input data;

a decompressing field designating step of designating a field different from a previous frame as a decompressing field in the case where a code amount of the field encoded data which was separated in said code separating step is equal to or less than a predetermined threshold value and designating the same field as the previous frame as a decompressing field in the case where the code amount of the field encoded data exceeds said predetermined threshold value;

a decompressing step of decompressing the field image data from the field encoded data which was separated in said code separating step;

an updating step of updating a relevant region of the decompressing field image data held in said reconstructed image holding step by the address designation based on the block information separated in the code separating step and the field information designated in the decompressing field designating step; and a field copying step of copying the decompressing field image data of the present frame which was updated in said updating step to another field image data which is not at present a target to be decompressed in the case where the decompressing fields of the previous and present frames which were obtained in said decompressing field designating step are the same.

19. A decompressing apparatus of image data for continuously decompressing the image data, comprising:

input means for inputting data including encoded data of one field image and block information indicative of the presence or absence of an effective block of said field image data;

reconstructed image holding means for holding the reconstructed field image data every field;

code separating means for separating the field encoded data, block information, and field information from said input data;

decompressing field designating means for designating a field different from a previous frame as a decompressing field in the case where a code amount of the field encoded data which was separated by said code separating means is equal to or less than a predetermined threshold value and designating the same field as the previous frame as a decompressing field in the case where the code amount of the field encoded data exceeds said predetermined threshold value;

decompressing means for decompressing the field image data from the field encoded data which was separated by said code separating means;

updating means for updating a relevant region of the decompressing field image data held by said reconstructed image holding means by the address designation based on the block information separated by said code separating means and the field information designated by said decompressing field designating means; and field copying means for copying the decompressing field image data of the present frame which was updated by said updating means to another field image data which is not at present a target to be decompressed in the case where the decompressing fields of the previous and present frames which were obtained by said decompressing field designating means are the same.

* * * * *